(12) United States Patent
Yu et al.

(10) Patent No.: US 11,847,971 B2
(45) Date of Patent: Dec. 19, 2023

(54) DISPLAY DEVICE, DRIVING CIRCUIT AND DISPLAY DRIVING METHOD

(71) Applicant: LG Display Co., Ltd., Seoul (KR)

(72) Inventors: Ri Yu, Seoul (KR); SangHyun Lim, Seoul (KR); Myoungjae Kang, Changwon-si (KR); Bonghwan Kim, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/743,147

(22) Filed: May 12, 2022

(65) Prior Publication Data
US 2023/0074067 A1 Mar. 9, 2023

(30) Foreign Application Priority Data
Sep. 3, 2021 (KR) .......................... 10-2021-0117869

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2310/027* (2013.01); *G09G 2310/0291* (2013.01); *G09G 2310/08* (2013.01)

(58) Field of Classification Search
CPC ........ G09G 3/3233; G09G 3/006; G09G 3/20; G09G 2320/0233; G09G 2320/043; G09G 2320/029; G09G 2320/0223; G09G 2320/045; G09G 2300/0819
See application file for complete search history.

(56) References Cited

U.S. PATENT DOCUMENTS

| 2016/0086548 A1* | 3/2016 | Maeyama | G09G 3/3233 345/82 |
|---|---|---|---|
| 2016/0365070 A1* | 12/2016 | Park | G09G 3/3225 |
| 2018/0005556 A1* | 1/2018 | Xu | G09G 3/3225 |
| 2021/0295781 A1* | 9/2021 | Kim | G09G 3/3275 |

* cited by examiner

*Primary Examiner* — Dong Hui Liang
(74) *Attorney, Agent, or Firm* — Fenwick & West LLP

(57) ABSTRACT

Embodiments of the present disclosure relate to a display device, comprising: a display panel in which a plurality of driving voltage feedback lines branched from a driving voltage line for supplying a driving voltage to a plurality of subpixels are disposed; a driving circuit for supplying a data voltage to the plurality of subpixels and determining a deviation of a feedback driving voltage detected through the plurality of driving voltage feedback lines; and a timing controller for compensating for image data depending on positions at which the plurality of driving voltage feedback lines are branched in the display panel based on the deviation of the feedback driving voltage, and supplying a compensated image data to the driving circuit.

16 Claims, 12 Drawing Sheets

DISPLAY DEVICE, DRIVING CIRCUIT AND DISPLAY DRIVING METHOD

CROSS-REFERENCE TO RELATED APPLICATION

This application claims the priority benefit of Republic of Korea Patent Application No. 10-2021-0117869, filed on Sep. 3, 2021 in the Korean Intellectual Property Office, which is hereby incorporated by reference in its entirety.

BACKGROUND

1. Technical Field

The present disclosure relates to a display device, a display panel, and display driving method capable of compensating for deviation of a driving voltage depending on positions in a display panel.

2. Discussion of the Related Art

With the development of the information society, there has been an increasing demand for a variety of types of image display devices. In this regard, a range of display devices, such as liquid crystal display device, and organic light emitting display device, have recently come into widespread use.

Among such display devices, the organic light emitting display devices have superior properties, such as rapid response speeds, high contrast ratios, high emissive efficiency, high luminance, and wide viewing angles, since self-emissive organic light emitting diodes are used as a light emitting element.

Such an organic light emitting display device may include organic light emitting diodes disposed in a plurality of subpixels aligned in a display panel, and may control the organic light emitting diodes to emit light by controlling a voltage flowing through the light emitting diodes, so as to display an image while controlling luminance of the subpixels.

Such a display device includes a driving voltage source for supplying various driving voltages required for driving the display panel to a driving circuit and the display panel, and various components for transmitting the driving voltages.

Such a display device includes the display panel in which a plurality of subpixels are arranged in a matrix form. The display panel receives scan signals from a gate driving circuit and data voltages from a data driving circuit to drive each of the subpixels. In addition, the display panel receives a plurality of driving voltages from a power management circuit.

Since the driving voltage supplied to the display panel is transmitted from the power management circuit located on one side of the display device, the driving voltage decreases as the distance from the power management circuit.

Accordingly, there may be a problem in that the luminance of the subpixels varies depending on the positions in the display panel, and the uniformity and quality of the image are degraded.

Meanwhile, in order to compensate for the deviation of the driving voltage of the subpixels depending on the positions in the display panel, the pulse width of the gate clock commonly supplied to one or more gate driving integrated circuits may be changed. However, when the pulse width of the gate clock is changed, the sampling time of the characteristic value of a driving transistor is changed, and thus, a problem of increasing the luminance deviation may occur in a case of low luminance.

SUMMARY

Accordingly, a display device, a driving circuit, and a display driving method capable of compensating for deviation of a driving voltage depending on positions in a display panel is disclosed.

Embodiments of the present disclosure provide a display device, a driving circuit, and a display driving method capable of detecting driving voltages from a plurality of positions in the display panel, and compensating for a data voltage according to a deviation of the driving voltage for each position.

Embodiments of the present disclosure provide a display device, a driving circuit, and a display driving method capable of effectively detecting a driving voltage through a touch line electrically connected to a driving voltage line at a plurality of positions in a display panel, and compensating for a data voltage according to a deviation of the driving voltage.

The problems to be described below according to the embodiments of the present disclosure are not limited to the problems mentioned above, and other problems that are not mentioned will be clearly understood by those skilled in the art from the following description.

A display device according to an embodiment of the present disclosure includes: a display panel in which a plurality of driving voltage feedback lines branched from a driving voltage line for supplying a driving voltage to a plurality of subpixels are disposed; a driving circuit for supplying a data voltage to the plurality of subpixels and determining a deviation of a feedback driving voltage detected through the plurality of driving voltage feedback lines; and a timing controller for compensating for image data depending on positions at which the plurality of driving voltage feedback lines are branched in the display panel based on the deviation of the feedback driving voltage, and supplying a compensated image data to the driving circuit.

A driving circuit according to an embodiment of the present disclosure includes: a differential amplifier circuit for comparing a plurality of feedback driving voltages detected through a plurality of driving voltage feedback lines branched from a driving voltage line supplying a driving voltage in a plurality of predetermined areas in a display panel including a plurality of subpixels; and an analog-to-digital converter for converting a differential voltage generated from the differential amplifier circuit into a digital signal.

A display driving method according to an embodiment of the present disclosure for driving a display device including a display panel in which a plurality of driving voltage feedlines are divided from a driving voltage line for supplying a driving voltage to a plurality of subpixels.

According to embodiments of the present disclosure, it is possible to provide a display device, a driving circuit and a display driving method capable of compensating for deviation of a driving voltage depending on positions in a display panel.

In addition, according to embodiments of the present disclosure, it is possible to provide a display device, a driving circuit and a display driving method capable of detecting driving voltages from a plurality of positions in the display panel, and compensating for a data voltage according to a deviation of the driving voltage for each position.

In addition, according to embodiments of the present disclosure, it is possible to provide a display device, a driving circuit and a display driving method capable of effectively detecting a driving voltage through a touch line electrically connected to a driving voltage line at a plurality of positions in a display panel, and compensating for a data voltage according to a deviation of the driving voltage.

The effects of the embodiments disclosed in the present disclosure are not limited to the above mentioned effects. In addition, the embodiments disclosed in the present disclosure may cause another effect not mentioned above, which will be clearly understood by those skilled in the art from the following description.

DETAILED DESCRIPTION

Figure 1:
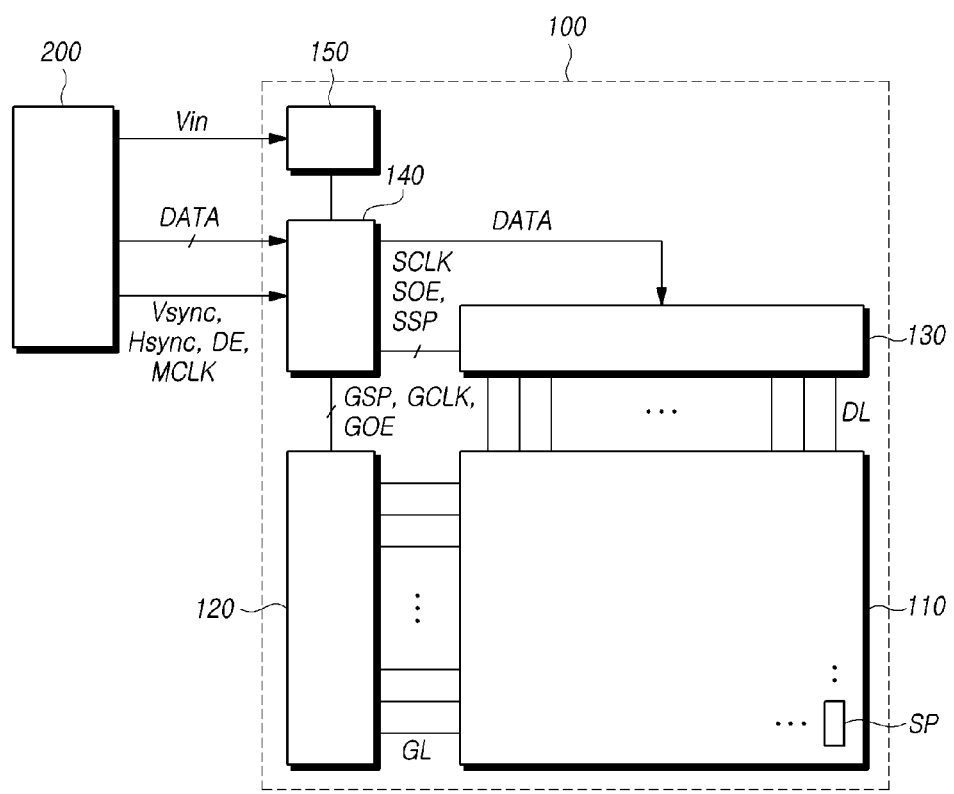
FIG. 1 illustrates a schematic diagram of a display device according to embodiments of the present disclosure.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in a variety of different forms. Rather, these embodiments are provided so that the present disclosure will be thorough and complete, and will fully convey the scope of the present disclosure to those having ordinary knowledge in the technical field. The scope of the present disclosure shall be defined by the appended claims.

The shapes, sizes, ratios, angles, numbers, and the like, inscribed in the drawings to illustrate exemplary embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms "comprise", "include", "have", and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

When spatially relative terms, such as "on", "above", "under", "below", and "on a side of", are used herein for descriptions of relationships between one element or component and another element or component, one or more intervening elements or components may be present between the one and other elements or components, unless a term, such as "directly", is used.

When temporally relative terms, such as "after", "subsequent", "following", and "before" are used to define a temporal relationship, a non-continuous case may be included unless the term "immediately" or "directly" is used.

In descriptions of signal transmission, such as "a signal is sent from node A to node B", a signal may be sent from node A to node B via another node unless the term "immediately" or "directly" is used.

In addition, terms, such as "first" and "second" may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of exemplary embodiments of the present disclosure may be partially or entirely coupled or combined with each other and may work in concert with each other or may operate in a variety of technical methods. In addition, respective exemplary embodiments may be carried out independently or may be associated with and carried out in concert with other embodiments.

Hereinafter, a variety of embodiments will be described in detail with reference to the accompanying drawings".

FIG. 1 illustrates a schematic diagram of a display device according to embodiments of the present disclosure.

Referring to FIG. 1, the display device 100 according to embodiments of the present disclosure may include a display panel 110 connected to a plurality of gate lines GL and a plurality of data lines DL in which a plurality of subpixels SP are arranged in rows and columns, a gate driving circuit 120 for supplying scan signals to the plurality of gate lines GL and a data driving circuit 130 for supplying data voltages to the plurality of data lines DL, a timing controller 140 for controlling the gate driving circuit 120 and the data driving circuit 130, and a power management circuit 150.

The display panel 110 displays an image based on the scan signals supplied from the gate driving circuit 120 through the plurality of gate lines GL and the data voltages supplied from the data driving circuit 130 through the plurality of data lines DL.

In the case of a liquid crystal display, the display panel 110 includes a liquid crystal layer formed between two substrates, and TN (twisted nematic) mode, VA (vertical alignment) mode, IPS (in plane switching) mode, FFS (fringe field switching) mode may be operated in any known mode. In the case of an organic light emitting display device, the display panel 110 may be implemented in a top emission method, a bottom emission method, or a dual emission method.

In the display panel 110, a plurality of pixels may be disposed in a matrix form. Each pixel may be composed of subpixels SP of different colors, for example, a white subpixel, a red subpixel, a green subpixel, and a blue subpixel. Each subpixel SP may be defined by the plurality of the data lines DL and the plurality of the gate lines GL.

A subpixel SP may include a thin film transistor (TFT) arranged in a region where a data line DL and a gate line GL intersect, a light emitting element such as a light emitting diode which is emitted according to the data voltage, and a storage capacitor for maintaining the data voltage by being electrically connected to the light emitting element.

For example, when the display device 100 having a resolution of 2,160×3,840 includes four subpixels SP of white W, red R, green G, and blue B, 3,840×4=15,360 data lines DL may be provided by 2,160 gate lines GL and 3,840 data lines DL respectively connected to 4 subpixels WRGB. Each of the plurality of subpixels SP may be disposed in areas in which the plurality of gate lines GL overlap the plurality of data lines DL.

The gate driving circuit 120 is controlled by the timing controller 140, and controls the driving timing of the plurality of subpixels SP by sequentially supplying the scan signals to the plurality of gate lines GL disposed in the display panel 110.

In the display device 100 having a resolution of 2,160× 3,840, an operation of sequentially supplying the scan signals to the 2,160 gate lines GL from the first gate line GL1 to the 2,160th gate line GL2160 may be referred to as 2,160-phase driving operation. Otherwise, an operation of sequentially supplying the scan signals to every four gate lines GL, as in a case in which the scan signals are supplied sequentially from first gate line GL1 to fourth gate lines GL4, and then are supplied sequentially from fifth gate line GL5 to eighth gate line GL8, may be referred to as 4-phase driving operation. As described above, an operation in which the scan signals are supplied sequentially to every N number of gate lines may be referred as N-phase driving operation.

The gate driving circuit 120 may include one or more gate driving integrated circuits (GDIC), which may be disposed on one side or both sides of the display panel 110 depending on the driving method. Alternatively, the gate driving circuit 120 may be implemented in a gate-in-panel (GIP) structure embedded in a bezel area of the display panel 110.

The data driving circuit 130 receives digital image data DATA from the timing controller 140, and converts the received digital image data DATA into an analog data voltage. Then, the data driving circuit 130 supplies the analog data voltage to each of the data lines DL at time which the scan signal is supplied through the gate line GL, so that each of the subpixels SP connected to the data lines DL emits light with a corresponding luminance in response to the analog data voltage.

Likewise, the data driving circuit 130 may include one or more source driving integrated circuits (SDIC). Each of the source driving integrated circuits SDIC may be connected to a bonding pad of the display panel 110 by a tape automated bonding (TAB) or a chip on glass (COG), or may be directly mounted on the display panel 110.

In some cases, each of the source driving integrated circuits (SDIC) may be integrated with the display panel 110. In addition, each of the source driving integrated circuits (SDIC) may be implemented with a chip on film (COF) structure. In this case, the source driving integrated circuit SDIC may be mounted on circuit film to be electrically connected to the data lines DL in the display panel 110 via the circuit film.

The timing controller 140 supplies various control signals to the gate driving circuit 120 and the data driving circuit 130, and controls the operations of the gate driving circuit 120 and the data driving circuit 130. That is, the timing controller 140 controls the gate driving circuit 120 to supply the scan signals in response to a time realized by respective frames, and on the other hand, transmits the image data DATA from an external source to the data driving circuit 130.

Here, the timing controller 140 receives various timing signals, including a vertical synchronization signal Vsync, a horizontal synchronization signal Hsync, a data enable signal DE, and a main clock MCLK, from an external host system 200.

The host system 200 may be any one of a TV (television) system, a set-top box, a navigation system, a personal computer (PC), a home theater system, a mobile device, and a wearable device.

Accordingly, the timing controller 140 generates control signals using the various timing signals received from the external source, and supplies the control signals to the gate driving circuit 120 and the data driving circuit 130.

For example, the timing controller 140 generates various gate control signals, including a gate start pulse GSP, a gate clock GCLK, and a gate output enable signal GOE, to control the gate driving circuit 120. Here, the gate start pulse GSP is used to control the start timing of one or more gate driving integrated circuits GDIC of the gate driving circuit 120. In addition, the gate clock GCLK is a clock signal commonly supplied to the one or more gate driving integrated circuits GDIC for controlling the shift timing of the scan signals. The gate output enable signal GOE designates timing information of the one or more gate driving integrated circuits GDIC.

In addition, the timing controller 140 generates various data control signals, including a source start pulse SSP, a source sampling clock SSC, and a source output enable signal SOE, to control the data driving circuit 130. Here, the source start pulse SSP is used to control the start timing for the data sampling of one or more source driving integrated circuits SDIC of the data driving circuit 130. The source sampling clock SSC is a clock signal for controlling a timing of data sampling in each of the source driving integrated circuits SDIC. The source output enable signal SOE controls the output timing of the data driving circuit 130.

The display device 100 may further include a power management circuit 150 for supplying or controlling various voltage or current to the display panel 110, the gate driving circuit 120, and the data driving circuit 130.

The power management circuit 150 generates a necessary power to drive the display panel 100, the gate driving circuit 120, and the data driving circuit 130 by controlling a DC input voltage Vin supplied from the host system 200.

The subpixel SP is positioned at a point where the gate line GL and the data line DL intersect and a light emitting element may be disposed in each of the subpixels SP. For example, the organic light emitting display device may include a light emitting element, such as a light emitting diode in each of the subpixels SP, and may display an image by controlling current flowing through the light emitting elements in response to the data voltage.

The display device 100 may be various types of devices such as a liquid crystal display, an organic light emitting display, and a plasma display panel.

Figure 2:
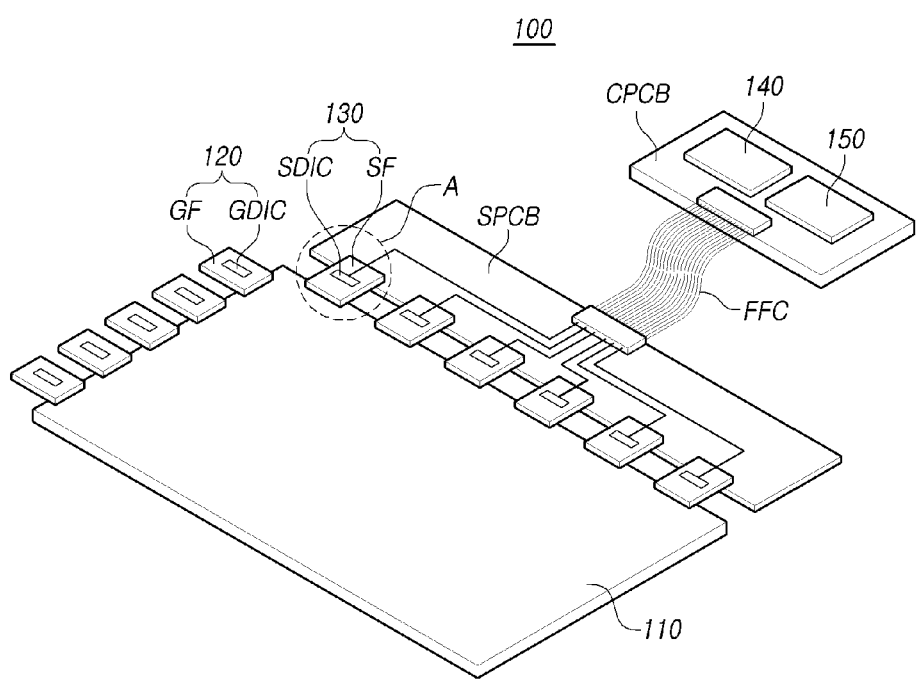
FIG. 2 illustrates a system diagram of the display device according to embodiments of the present disclosure.

FIG. 2 illustrates a system diagram of the display device according to embodiments of the present disclosure.

As an example, FIG. 2 illustrates that each of the source driving integrated circuits SDIC of the data driving circuit 130 and each of the gate driving integrated circuits GDIC of the gate driving circuit 120 in the display device 100 according to embodiments of the present disclosure are implemented with a COF type among various structures such as a TAB, a COG, and a COF.

One or more gate driving integrated circuits GDIC included in the gate driving circuit 120 may be respectively mounted on the gate film GF, and one side of the gate film GF may be electrically connected to the display panel 110. Also, electrical lines may be disposed on the gate film GF to electrically connect the gate driving integrated circuit GDIC and the display panel 110.

Likewise, the data driving circuit 130 may include one or more source driving integrated circuits SDIC, which may be mounted on a source film SF, respectively. One portion of the source film SF may be electrically connected to the display panel 110. In addition, electrical lines may be disposed on the source films SF to electrically connect the source driving integrated circuits SDIC and the display panel 110.

The display device 100 may include at least one source printed circuit board SPCB in order to connect the plurality of source driving integrated circuits SDIC to other devices by electrical circuit, and a control printed circuit board CPCB in order to mount various control components and electric elements.

The other portion of the source film SF, on which the source driving integrated circuit SDIC is mounted, may be connected to the at least one source printed circuit board SPCB. That is, one portion of source film SF on which the source driving integrated circuit SDIC is mounted may be electrically connected to the display panel 110, and the other portion of the source film SF may be electrically connected to the source printed circuit board SPCB.

The timing controller 140 and a power management circuit 150 may be mounted on the control printed circuit board CPCB. The timing controller 140 may control the operations of the data driving circuit 130 and the gate driving circuit 120. The power management integrated circuit 150 may supply a driving voltage and a driving current, or control a voltage and a current for the data driving circuit 130 and the gate driving circuit 120.

At least one source printed circuit board SPCB and the control printed circuit board CPCB may have circuitry connection by at least one connecting member. The connecting member may be, for example, a flexible printed circuit FPC, a flexible flat cable FFC, or the like. In this case, the connecting member to connect at least one source printed circuit board SPCB and the control printed circuit board CPCB may be variously changed according to the size and type of the display device 100. At least one source printed circuit board SPCB and the control printed circuit board CPCB may be integrated into a single printed circuit board.

In the display device 100 having the above described configuration, the power management circuit 150 supplies the driving voltage, which is required for a display driving operation or a sensing operation of the characteristic value, to the source printed circuit board SPCB through the flexible printed circuit FPC or the flexible flat cable FFC. The driving voltage supplied to the source printed circuit board SPCB, is transmitted to emit or sense a specific subpixel SP in the display panel 110 via the source driving integrated circuits SDIC.

Each of the subpixels SP arranged in the display panel 110 of the display device 100 may include an organic light emitting diode as a light emitting element and circuit elements, such as a driving transistor to drive it.

The type and number of the circuit elements constituting each of the subpixels SP may be variously determined depending on the function, the design, or the like.

Figure 3:
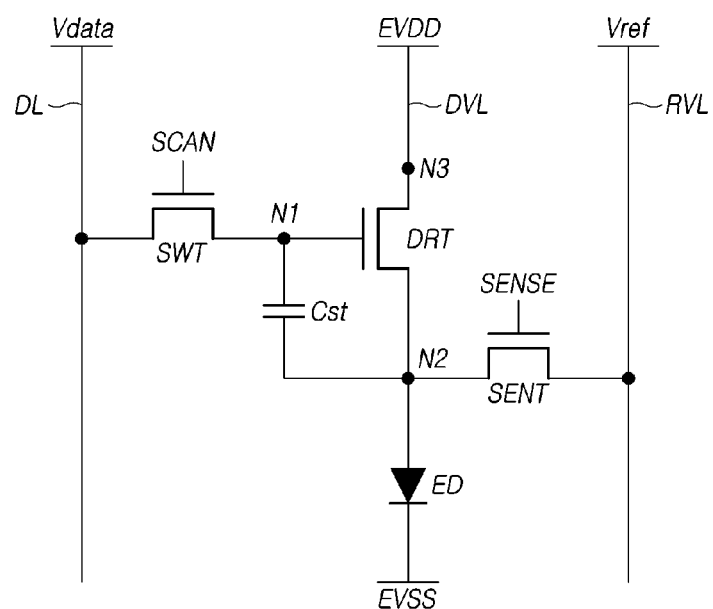
FIG. 3 illustrates a circuit diagram of a subpixel in the display device according to embodiments of the present disclosure.

FIG. 3 illustrates a circuit diagram of a subpixel in the display device according to embodiments of the present disclosure.

Referring to FIG. 3, each of the subpixels SP arranged in the display device 100 according to embodiments of the present disclosure may include one or more transistors, a capacitor, and an organic light emitting diode as a light emitting element ED.

For example, a subpixel SP may include a driving transistor DRT, a switching transistor SWT, a sensing transistor SENT, a storage capacitor Cst, and a light emitting element ED.

The driving transistor DRT may have a first node N1, a second node N2, and a third node N3. The first node N1 of the driving transistor DRT may be a gate node to be supplied a data voltage Vdata through a data line DL when the switching transistor SWT is turned on. The second node N2 of the driving transistor DRT may be electrically connected to an anode electrode of the light emitting element ED, and may be a drain node or a source node. The third node N3 of the driving transistor DRT may be electrically connected to a driving voltage line DVL to be supplied a driving voltage EVDD, and may be a source node or a drain node.

Here, the driving voltage EVDD for displaying an image may be supplied to the driving voltage line DVL in the display driving period. For example, the driving voltage EVDD for displaying the image may be about 27V.

The switching transistor SWT is electrically connected between the first node N1 of the driving transistor DRT and the data line DL, and operates in response to a scan signal SCAN supplied thereto through the gate line GL connected to the gate node. In addition, it controls the operation of the driving transistor DRT by transmitting the data voltage Vdata through the data line DL to the gate node of the driving transistor DRT when the switching transistor SWT is turned on.

The sensing transistor SENT is electrically connected between the second node N2 of the driving transistor DRT and a reference voltage line RVL, and operates in response to a sense signal SENSE supplied through the gate line GL connected to a gate node. When the sensing transistor SENT is turned on, a reference voltage Vref supplied from the reference voltage line RVL is transmitted to the second node N2 of the driving transistor DRT.

That is, the voltages of the first node N1 and the second node N2 of the driving transistor DRT may be controlled by controlling the switching transistor SWT and the sensing transistor SENT. Consequently, a current for emitting the light emitting element ED may be supplied.

Each gate node of the switching transistor SWT and the sensing transistor SENT may be connected to a single gate line GL or to different gate lines GL. Here, it illustrates an exemplary structure of which the switching transistor SWT and the sensing transistor SENT are connected to a different gate lines GL. In this case, the switching transistor SWT and the sensing transistor SENT are controlled independently by the scan signal SCAN and the sense signal SENSE transmitted from the different gate lines GL.

On the other hand, when the switching transistor SWT and the sensing transistor SENT are connected to single gate line GL, the switching transistor SWT and the sensing transistor SENT are controlled simultaneously by the scan signal SCAN or the sense signal SENSE transmitted from the single gate line GL, and thus the aperture ratio of the subpixels SP may be improved.

In addition, the transistors disposed in the subpixels SP may be not only n-type transistors, but also p-type transistors. Herein, it illustrates the exemplary structure of the n-type transistors.

The storage capacitor Cst is electrically connected between the first node N1 and the second node N2 of the driving transistor DRT, and serves to maintain the data voltage Vdata during a frame.

Such a storage capacitor Cst may be connected between the first node N1 and the third node N3 of the driving transistor DRT according to a type of the driving transistor DRT. The anode electrode of the light emitting element ED may be electrically connected to the second node N2 of the driving transistor DRT, and a base voltage EVSS may be supplied to a cathode electrode of the light emitting element ED.

Here, the base voltage EVSS may be the ground voltage or a voltage higher or lower than the ground voltage. In addition, the base voltage EVSS may be varied depending on the driving condition. For example, the base voltage EVSS during the display driving period may be different from the base voltage EVSS during the sensing period.

The structure of the subpixel SP described above for example is a 3T (transistor) 1C (capacitor) structure, which is only an example for explanation, and further includes one or more transistors, or in some cases, further include one or more capacitors. Alternatively, each of the plurality of subpixels SP may have the same structure, or some of the plurality of subpixels SP may have a different structure.

The display device 100 according to an embodiment of the present disclosure may use a method for measuring a current flowing by voltage charged in the storage capacitor Cst during a sensing period of the characteristic value for the driving transistor DRT in order to effectually sense the characteristic value of the driving transistor DRT like threshold voltage or mobility. Such a method may be referred to as a current sensing operation.

That is, the characteristic value or variation of the characteristic value of the driving transistor DRT in the subpixel SP may be determined by measuring the current flowing by voltage charged in the storage capacitor Cst during the sensing period of the characteristic value for the driving transistor DRT.

At this time, the reference voltage line RVL may be referred to as a sensing line since the reference voltage line RVL serves not only to supply the reference voltage Vref but also serves as a sensing line for sensing the characteristic value of the driving transistor DRT in the subpixel SP.

Figure 4:
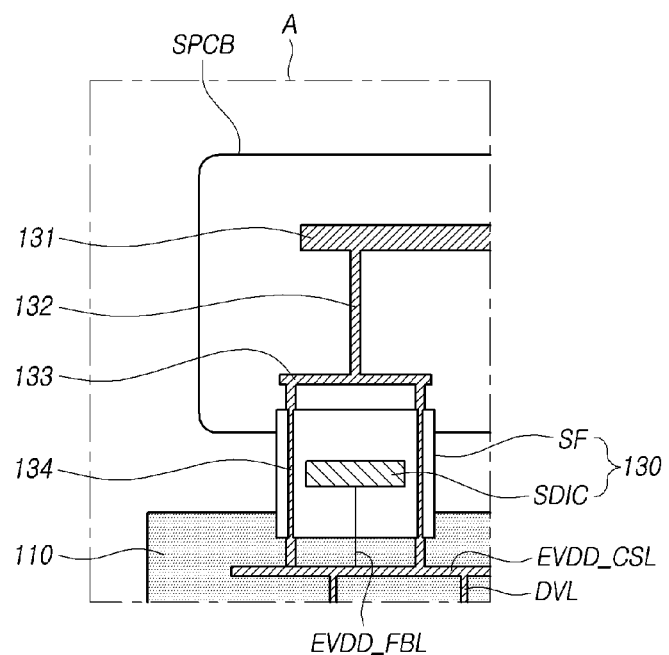
FIG. 4 illustrates a diagram of a transmission path of a subpixel driving voltage in a display device according to an embodiment of the present disclosure.

FIG. 4 illustrates a diagram of a transmission path of a subpixel driving voltage in a display device according to an embodiment of the present disclosure. Here, a part A is shown in FIG. 2.

Referring to FIG. 4, in the display device 100 according to an embodiment of the present disclosure, a plurality of subpixels SP defined by a plurality of data lines DL and a plurality of gate lines GL crossing each other are disposed on the display panel 110. In this case, each subpixel SP receives the subpixel driving voltage EVDD through a plurality of driving voltage lines DVL arranged in parallel to the plurality of data lines DL.

The plurality of driving voltage lines DVL may be arranged between the plurality of data lines DL so as to be parallel to the plurality of data lines DL, respectively, or may be arranged to be shared between the left and right adjacent two subpixels SP.

The plurality of driving voltage lines DVL may be commonly connected to a common driving voltage line EVDD_CSL arranged in an upper bezel area of the display panel 110. In this case, since the subpixel driving voltage EVDD is transmitted to the plurality of driving voltage lines DVL through the common driving voltage line EVDD_CSL arranged in the upper bezel area of the display panel 110, the common driving voltage line EVDD_CSL and the plurality of driving voltage lines DVL may be collectively referred to as a driving voltage line DVL.

The subpixel driving voltage EVDD transmitted from the power management circuit 150 may be supplied to the common driving voltage line EVDD_CSL through the plurality of data driving circuits 130.

In order to transmit the subpixel driving voltage EVDD to the plurality of driving voltage lines DVL, a first driving voltage supply line 131, a second driving voltage supply line 132, a third driving voltage supply line 133, and a fourth driving voltage supply line 134 may be disposed.

The first driving voltage supply line 131, the second driving voltage supply line 132, and the third driving voltage supply line 133 may be electrically connected to each other in the source printed circuit board SPCB.

The fourth driving voltage supply line 134 may be arranged to be branched to both sides or one side of the source driving integrated circuit SDIC in the data driving circuit 130. Furthermore, fourth driving voltage supply line 134 may electrically connect the third driving voltage supply line 133 and the common driving voltage line EVDD_CSL.

The third driving voltage supply line 133 may be disposed in a region adjacent to the source film SF and electrically connected to the fourth driving voltage supply line 134 arranged in the data driving circuit 130.

Since the first driving voltage supply line 131 is a portion in which the subpixel driving voltage EVDD transmitted from the power management circuit 150 is densely supplied, it may be relatively larger area than that of the third driving voltage supply line 133.

The second driving voltage supply line 132 is branched from the first driving voltage supply line 131 and may be arranged to have a constant interval. Also, it is connected to the third driving voltage supply line 133.

At this time, the subpixel driving voltage EVDD supplied from the power management circuit 150 may have a voltage drop (IR drop) due to a resistance component of signal line while it is transmitted through the driving voltage supply lines 131, 132, 133, 134 and the driving voltage line DVL.

Accordingly, in order to detect the voltage drop of the subpixel driving voltage EVDD, the voltage at the common driving voltage line EVDD_CSL may be measured by arranging a driving voltage feedback line EVDD_FBL in the common driving voltage line EVDD_CSL.

Meanwhile, the subpixel driving voltage EVDD is supplied to the entire area of the display panel 110 through the driving voltage line DVL. Accordingly, when the driving voltage feedback line EVDD_FBL is arranged in the common driving voltage line EVDD_CSL, the subpixel driving voltage EVDD in the upper bezel area of the display panel 110 may be detected, but there is a disadvantage in that the subpixel driving voltage EVDD in an active region where an image is displayed at the display panel 110 cannot be detected.

Accordingly, the display device 100 according to an embodiment of the present disclosure may compensate the data voltage Vdata according to deviation of the subpixel driving voltage EVDD detected through a plurality of driving voltage feedback lines by arranging the plurality of driving voltage feedback lines capable of detecting the subpixel driving voltage EVDD in a plurality of areas of the display panel 110.

Figure 5:
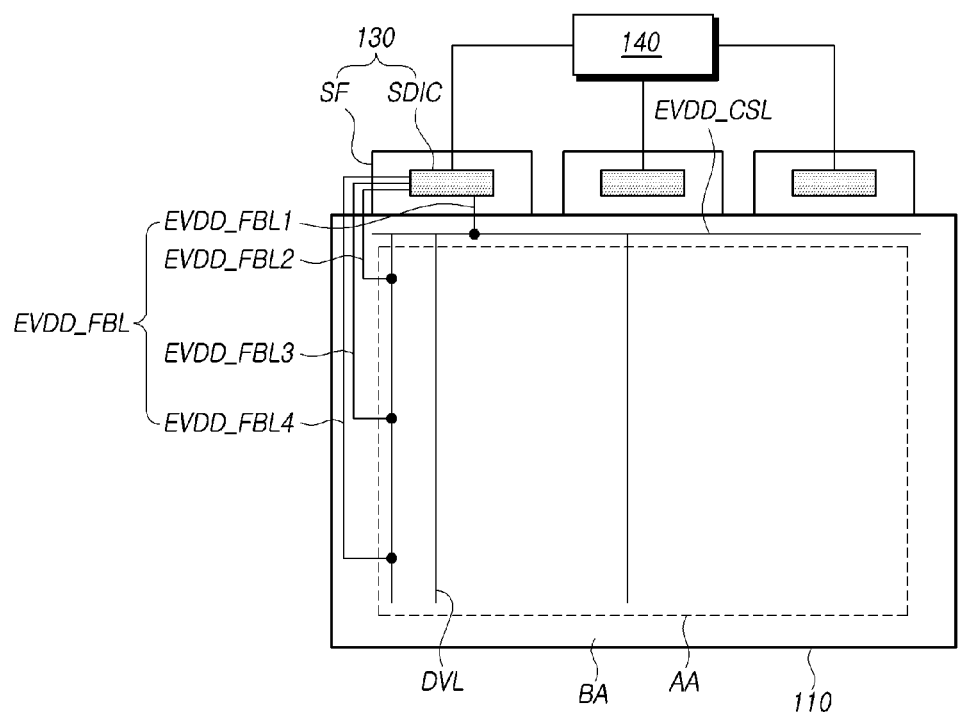
FIG. 5 illustrates a diagram of a structure in which a plurality of driving voltage feedback lines are arranged in order to detect a deviation of a subpixel driving voltage in a display device according to an embodiment of the present disclosure.

FIG. 5 illustrates a diagram of a structure in which a plurality of driving voltage feedback lines are arranged in order to detect a deviation of a subpixel driving voltage in a display device according to an embodiment of the present disclosure.

Referring to FIG. 5, the display device 100 according to an embodiment of the present disclosure may include a display panel 110, a data driving circuit 130, and a timing controller 140.

The display panel 110 may include an active area AA in which an image is displayed through the plurality of subpixels SP, and a bezel area BA located outside the active area AA in which driving circuits such as a gate driving circuit 120 and a data driving circuit 130 are disposed.

A driving voltage line DVL supplying a subpixel driving voltage EVDD to the plurality of subpixels SP and a plurality of driving voltage feedback lines EVDD_FBL1, EVDD_FBL2, EVDD_FBL3, EVDD_FBL4 branched from a predetermined area or point of the driving voltage line DVL may be arranged in the display panel 110.

The driving voltage line DVL may be arranged in the bezel area BA of the display panel 110 adjacent to the data driving circuit 130 and include a common driving voltage line EVDD_CSL which is commonly connected to the driving voltage lines DVL.

One of the plurality of driving voltage feedback lines EVDD_FBL may be used as a reference driving voltage feedback line for detecting a deviation of the subpixel driving voltage EVDD. In this case, the deviation of the subpixel driving voltage EVDD may be determined based on a voltage corresponding to the reference driving voltage feedback line.

For example, the reference driving voltage feedback line may be a first driving voltage feedback line EVDD_FBL1 arranged between the data driving circuit 130 and the common driving voltage line EVDD_CSL. The subpixel driving voltage EVDD detected through the first driving voltage feedback line EVDD_FBL1 may be referred to as a first feedback driving voltage. However, the position of the reference driving voltage feedback line may be variously changed according to the structure of the display panel 110 or the data driving circuit 130.

A second driving voltage feedback line EVDD_FBL2 may be branched from the driving voltage line DVL in the upper area of the display panel 110 to be connected to the data driving circuit 130. The subpixel driving voltage EVDD detected through the second driving voltage feedback line EVDD_FBL2 may be referred to as a second feedback driving voltage.

In this case, the second driving voltage feedback line EVDD_FBL2 may be connected to a drain node or a source node of the driving transistor DRT disposed in the subpixel SP of the upper area of the display panel 110. The second driving voltage feedback line EVDD_FBL2 and the driving voltage line DVL may be electrically connected through a contact hole formed in the active area AA.

A third driving voltage feedback line EVDD_FBL3 may be branched from the driving voltage line DVL in the central area of the display panel 110 to be connected to the data driving circuit 130. The subpixel driving voltage EVDD detected through the third driving voltage feedback line EVDD_FBL3 may be referred to as a third feedback driving voltage.

In this case, the third driving voltage feedback line EVDD_FBL3 may be connected to a drain node or a source node of the driving transistor DRT disposed in the subpixel SP of the central area of the display panel 110. The third driving voltage feedback line EVDD_FBL3 and the driving voltage line DVL may be electrically connected through a contact hole formed in the active area AA.

A fourth driving voltage feedback line EVDD_FBL4 may be branched from the driving voltage line DVL in the lower area of the display panel 110 to be connected to the data driving circuit 130. The subpixel driving voltage EVDD detected through the fourth driving voltage feedback line EVDD_FBL4 may be referred to as a fourth feedback driving voltage.

In this case, the fourth driving voltage feedback line EVDD_FBL4 may be connected to a drain node or a source node of the driving transistor DRT disposed in the subpixel SP of the lower area of the display panel 110. The fourth driving voltage feedback line EVDD_FBL4 and the driving voltage line DVL may be electrically connected through a contact hole formed in the active area AA.

At this time, it is preferable that the second to fourth driving voltage feedback lines EVDD_FBL2, EVDD_FBL3, EVDD_FBL4 are connected to the data driving circuit 130 by being branched from the driving voltage line DVL of the display panel 110 and extended through the bezel area BA.

The driving voltage feedback line EVDD_FBL may be a separate conductive line for detecting the subpixel driving voltage EVDD.

Alternatively, in the case of the display device 100 capable of touch sensing, a touch line transmitting a touch signal may be used as at least one of the driving voltage feedback lines EVDD_FBL by electrically connecting it to the driving voltage line DVL. When the touch line is used as at least one of the driving voltage feedback lines EVDD_FBL, a period in which the subpixel driving voltage EVDD is detected and a period in which the touch signal is transmitted through the touch line and the driving voltage feedback line EVDD_FBL may be different in time from each other.

Here, it illustrates a case in which the second to fourth driving voltage feedback lines EVDD_FBL2, EVDD_FBL3, EVDD_FBL4 are respectively connected to the upper area, the central area, and the lower area of the display panel 110 as an example, but the position and number of the driving voltage feedback lines EVDD_FBL may be variously changed. Although the data driving circuit 130 is arranged on the top of the display panel 110, and the second to fourth driving voltage feedback lines EVDD_FBL2, EVDD_FBL3, EVDD_FBL4 sequentially are arranged on an upper area, a central area, and a lower area in FIG. 5, the arrangement is not limited thereto. In addition, the upper area, the central area, and the lower area at which the second to fourth driving voltage feedback lines EVDD_FBL2, EVDD_FBL3, EVDD_FBL4 are branched are just terms to refer to positions of the corresponding driving voltage line DVL from each other, and not limited to these terms.

The data driving circuit 130 supplies the data voltage Vdata to display image on the plurality of subpixels SP. Also, the data driving circuit 130 compares the subpixel driving voltage EVDD detected through the driving voltage feedback line EVDD_FBL and generates a deviation of the subpixel driving voltage EVDD.

The timing controller 140 compensates the image data DATA according to the position in the display panel 110 based on the deviation of the subpixel driving voltage EVDD, and supplies the compensated image data to the data driving circuit 130.

Accordingly, it is possible to compensate the data voltage Vdata by reflecting the deviation of the subpixel driving voltage EVDD depending on the position in the display panel 110, and as a result, it is possible to reduce the luminance deviation and improve the image quality.

Figure 6:
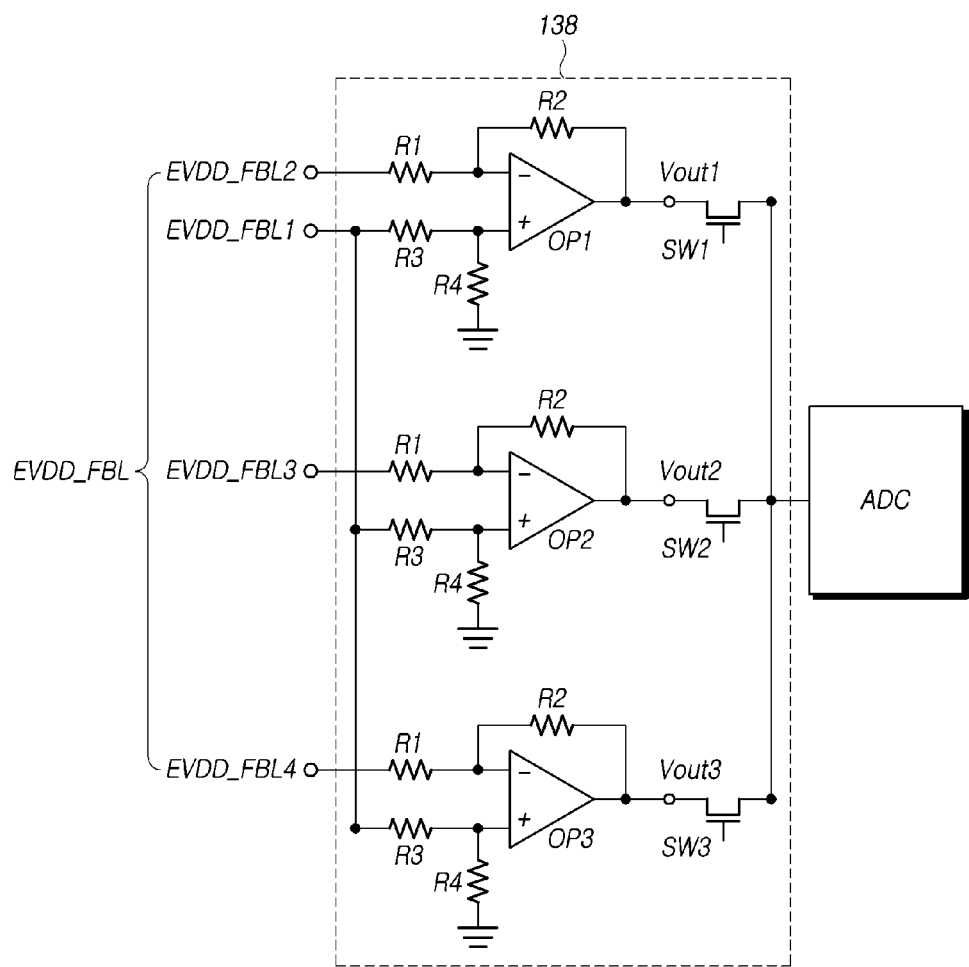
FIG. 6 illustrates a diagram of a data driving circuit for detecting a deviation of a subpixel driving voltage depending on positions in a display panel of a display device according to an embodiment of the present disclosure.

FIG. 6 illustrates a diagram of a data driving circuit for detecting a deviation of a subpixel driving voltage depending on positions in a display panel of a display device according to an embodiment of the present disclosure.

Referring to FIG. 6, the data driving circuit 130 of the display device 100 according to an embodiment of the present disclosure may include a differential amplifier circuit 138 and an analog-to-digital converter ADC.

The differential amplifier circuit 138 may include a plurality of operational amplifiers OP1, OP2, OP3 which receive the subpixel driving voltage EVDD detected from the plurality of driving voltage feedback lines EVDD_FBL branched in a plurality of areas in the display panel 110 as an input.

In this case, one of the plurality of driving voltage feedback lines EVDD_FBL may be used as a reference driving voltage feedback line for detecting a deviation of the subpixel driving voltage EVDD. Here, it illustrates a case where the first driving voltage feedback line EVDD_FBL1 arranged between the data driving circuit 130 and the common driving voltage line EVDD_CSL is used as the reference driving voltage feedback line.

The first operational amplifier OP1 generates a first differential voltage Vout1 according to a deviation between the first driving voltage feedback line EVDD_FBL1 corresponding to the reference driving voltage feedback line and the second driving voltage feedback line EVDD_FBL2.

The second driving voltage feedback line EVDD_FBL2 is connected to the inverting input terminal (−) of the first operational amplifier OP1 through a first resistor RE A second resistor R2 is connected between the inverting input terminal (−) and the output terminal of the first operational amplifier OP1. The first driving voltage feedback line EVDD_FBL1 is connected to the non-inverting input terminal (+) of the first operational amplifier OP1 through the third resistor R3. A fourth resistor R4 is connected between the non-inverting input terminal (+) of the first operational amplifier OP1 and the ground.

Accordingly, the first operational amplifier OP1 generates the first differential voltage Vout1 according to a difference between the first driving voltage feedback line EVDD_FBL1 corresponding to the reference driving voltage feedback line and the second driving voltage feedback line EVDD_FBL2.

The second operational amplifier OP2 generates a second differential voltage Vout2 according to a deviation between the first driving voltage feedback line EVDD_FBL1 and the third driving voltage feedback line EVDD_FBL3.

The third driving voltage feedback line EVDD_FBL3 is connected to the inverting input terminal (−) of the second operational amplifier OP2 through a first resistor RE A second resistor R2 is connected between the inverting input terminal (−) and the output terminal of the second operational amplifier OP2. The first driving voltage feedback line EVDD_FBL1 is connected to the non-inverting input terminal (+) of the second operational amplifier OP2 through the third resistor R3. A fourth resistor R4 is connected between the non-inverting input terminal (+) of the second operational amplifier OP2 and the ground.

Accordingly, the second operational amplifier OP2 generates the second differential voltage Vout2 according to a difference between the first driving voltage feedback line EVDD_FBL1 corresponding to the reference driving voltage feedback line and the third driving voltage feedback line EVDD_FBL3.

The third operational amplifier OP3 generates a third differential voltage Vout3 according to a deviation between the first driving voltage feedback line EVDD_FBL1 and the fourth driving voltage feedback line EVDD_FBL4.

The fourth driving voltage feedback line EVDD_FBL4 is connected to the inverting input terminal (−) of the third operational amplifier OP3 through a first resistor RE A second resistor R2 is connected between the inverting input terminal (−) and the output terminal of the third operational amplifier OP3. The first driving voltage feedback line EVDD_FBL1 is connected to the non-inverting input terminal (+) of the third operational amplifier OP3 through the third resistor R3. A fourth resistor R4 is connected between the non-inverting input terminal (+) of the third operational amplifier OP3 and the ground.

Accordingly, the third operational amplifier OP3 generates the third differential voltage Vout3 according to a difference between the first driving voltage feedback line EVDD_FBL1 corresponding to the reference driving voltage feedback line and the fourth driving voltage feedback line EVDD_FBL4.

When the first driving voltage feedback line EVDD_FBL1 is branched from the common driving voltage line EVDD_CSL arranged in the upper bezel area BA of the display panel 110, the second driving voltage feedback line EVDD_FBL2 is branched from the driving voltage line DVL in the upper area of the display panel 110, the third driving voltage feedback line EVDD_FBL3 is branched from the driving voltage line DVL in the central area of the display panel 110, and the fourth driving voltage feedback line EVDD_FBL4 is branched from the driving voltage line DVL in the lower area of the display panel 110, the subpixel driving voltage EVDD detected from the first driving voltage feedback line EVDD_FBL1 may be the highest level and the subpixel driving voltage EVDD detected from the fourth driving voltage feedback line EVDD_FBL4 may be the lowest level.

In this case, the level of the subpixel driving voltage EVDD detected from the first to fourth driving voltage feedback lines EVDD_FBL1, EVDD_FBL2, EVDD_FBL3, EVDD_FBL4 may be decreased with a linear function of the distance from the data driving circuit 130, or may be decreased with a second-order function or third-order function of the distance from the data driving circuit 130 due to the influence of various circuit elements disposed on the display panel 110.

For example, when the values of the first resistor R1 to the fourth resistor R4 are all the same, the first differential voltage Vout1 corresponding to the difference between the first driving voltage feedback line EVDD_FBL1 and the second driving voltage feedback line EVDD_FBL2 has the smallest value, the second differential voltage Vout2 corresponding to the difference between the first driving voltage feedback line EVDD_FBL1 and the third driving voltage feedback line EVDD_FBL3 has a middle value, and the third differential voltage Vout3 corresponding to the difference between the first driving voltage feedback line EVDD_FBL1 and the fourth driving voltage feedback line EVDD_FBL4 has the largest value.

The differential voltages Vout1, Vout2, Vout3 correspond to a deviation of the subpixel driving voltage EVDD between the common driving voltage line EVDD_CSL and each area of the display panel 110.

In this case, the level of the subpixel driving voltage EVDD detected in the first to fourth driving voltage feedback lines EVDD_FBL1, EVDD_FBL2, EVDD_FBL3, EVDD_FBL4 may be changed according to the values of the first resistor R1 to fourth resistors R4 constituting the differential amplifier circuit 138 in consideration of a function relationship with a distance from the data driving circuit 130.

The differential voltages Vout1, Vout2, Vout3 generated by the operational amplifiers OP1, OP2, OP3 are transmitted to the analog-to-digital converter ADC according to operations of a first switch SW1 to a third switch SW3 connected to the output terminals of the operational amplifiers OP1, OP2, OP3.

The analog-to-digital converter ADC converts the differential voltages Vout1, Vout2, Vout3 generated by the operational amplifiers OP1, OP2, OP3 into a digital differential signal, and transmits it to the timing controller 140.

The timing controller 140 compensates the image data DATA according to positions in the display panel 110 based on the digital differential signal transmitted from the analog-to-digital converter ADC, and supplies the compensated image data to the data driving circuit 130.

On the other hand, the deviation of the subpixel driving voltage EVDD according to positions in the display panel 110 may be changed depending on not only the distance from the data driving circuit 130, but also the type of the display panel 110, grayscale and luminance emitted on the display panel 110. Accordingly, the display device 100 according to an embodiment of the present disclosure may respectively store compensation values in the memory MEM according to the type of the display panel 110 and the grayscale or luminance for displaying an image, and may individually determine the compensation value of the image data DATA according to the light emission situation of the display panel 110.

Figure 7:
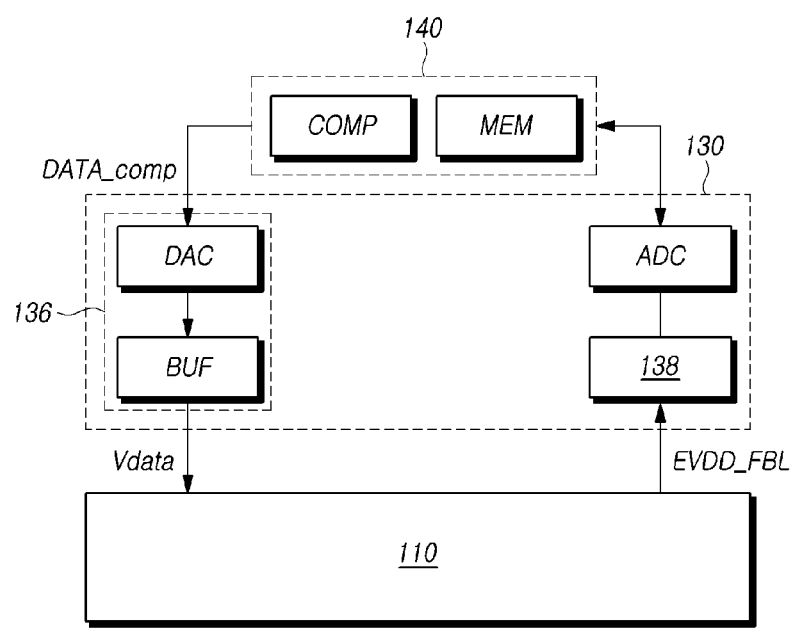
FIG. 7 illustrates a schematic diagram of a compensation process for a data voltage supplied to a display panel based on a deviation of a subpixel driving voltage according to positions in the display panel of the display device according to an embodiment of the present disclosure.

FIG. 7 illustrates a schematic diagram of a compensation process for a data voltage supplied to a display panel based on a deviation of a subpixel driving voltage according to positions in the display panel of the display device according to an embodiment of the present disclosure.

Referring to FIG. 7, the display device 100 according to an embodiment of the present disclosure may include components for compensating for a deviation of the subpixel driving voltage EVDD according to positions in the display panel 110.

For example, the display device 100 may consider a deviation of the subpixel driving voltage EVDD detected through the driving voltage line DVL in the upper, central, and lower areas of the display panel 110 during a display driving period to which the subpixel driving voltage EVDD is supplied.

The display device 100 may include a differential amplifier circuit 138 for detecting a voltage deviation of the driving voltage feedback line EVDD_FBL branched from the driving voltage line DVL in several areas of the display panel 110, and an analog-to-digital converter ADC that converts the differential voltage generated from the differential amplifier circuit 138 into a digital differential signal.

The timing controller 140 of the display device 100 may include a memory MEM that stores a digital differential signal transmitted from the analog-to-digital converter ADC or a reference values in advance, and a compensating circuit COMP for compensating for a deviation of the subpixel driving voltage EVDD by comparing a received digital differential signal and the reference values stored in the MEM. In this case, the compensation value determined by the compensating circuit COMP may be stored in the memory MEM.

Accordingly, the timing controller 140 may compensate the image data DATA to be supplied to the data driving circuit 130 by using the compensation value determined by the compensating circuit COMP, and supply the compensated image data DATA_comp to the data driving circuit 130.

Accordingly, the data driving circuit 130 may convert the compensated image data DATA_comp through the digital-to-analog converter DAC into a data voltage Vdata in the form of an analog signal, and transmit the converted data voltage Vdata to the corresponding data line DL through the output buffer BUF. As a result, the deviation of the subpixel driving voltage EVDD according to positions of the subpixels SP may be compensated.

The compensating circuit COMP may be arranged outside the timing controller 140, or may be arranged in the timing controller 140. The memory MEM may be arranged outside the timing controller 140, or may be implemented in the form of a register inside the timing controller 140.

Meanwhile, the driving voltage feedback line EVDD_FBL for detecting the subpixel driving voltage EVDD in the display device 100 according to an embodiment of the present disclosure may be formed of a separate conductive line. Otherwise, in the display device 100 providing a touch function, a touch line connecting a touch electrode to a touch driving circuit may be used as all or a part of the driving voltage feedback line EVDD_FBL.

The display device 100 providing a touch function may use a touch sensing method based on capacitance. It may sense a touch using a mutual-capacitance method, or may sense a touch using a self-capacitance method.

In the case of a touch sensing method based on mutual-capacitance, a plurality of touch electrodes may include a touch driving electrode to which a touch driving signal is supplied through a touch driving line, and a touch sensing electrode forming capacitance with the touch driving electrode from which a touch sensing signal is detected through a touch sensing line. The touch driving line and the touch sensing line may be collectively referred to as a touch line. The touch driving signal and the touch sensing signal may be collectively referred to as a touch signal.

In the case of the touch sensing method based on mutual-capacitance, the presence of a touch and touch coordinates are detected based on the change in mutual-capacitance that occurs between the touch driving electrode and the touch sensing electrode according to the presence of a pointer such as a finger or pen.

In the case of the touch sensing method based on self-capacitance, each touch electrode has functions as both a touch driving electrode and a touch sensing electrode. That is, a touch driving signal is supplied to the touch electrode through one touch line, and a touch sensing signal transmitted from the touch electrode to which the touch driving signal is supplied is received through the same touch line. Accordingly, in the touch sensing method based on self-capacitance, there is no distinction between the touch driving electrode and the touch sensing electrode, and no distinction between the touch driving line and the touch sensing line.

In the case of such a touch sensing method based on self-capacitance, the presence of a touch and touch coordinates are detected based on a change in capacitance that occurs between a pointer such as a finger or a pen and a touch electrode.

As described above, the display device 100 may sense a touch using a touch sensing method based on mutual-capacitance or may sense a touch using a touch sensing method based on self-capacitance.

Figure 8:
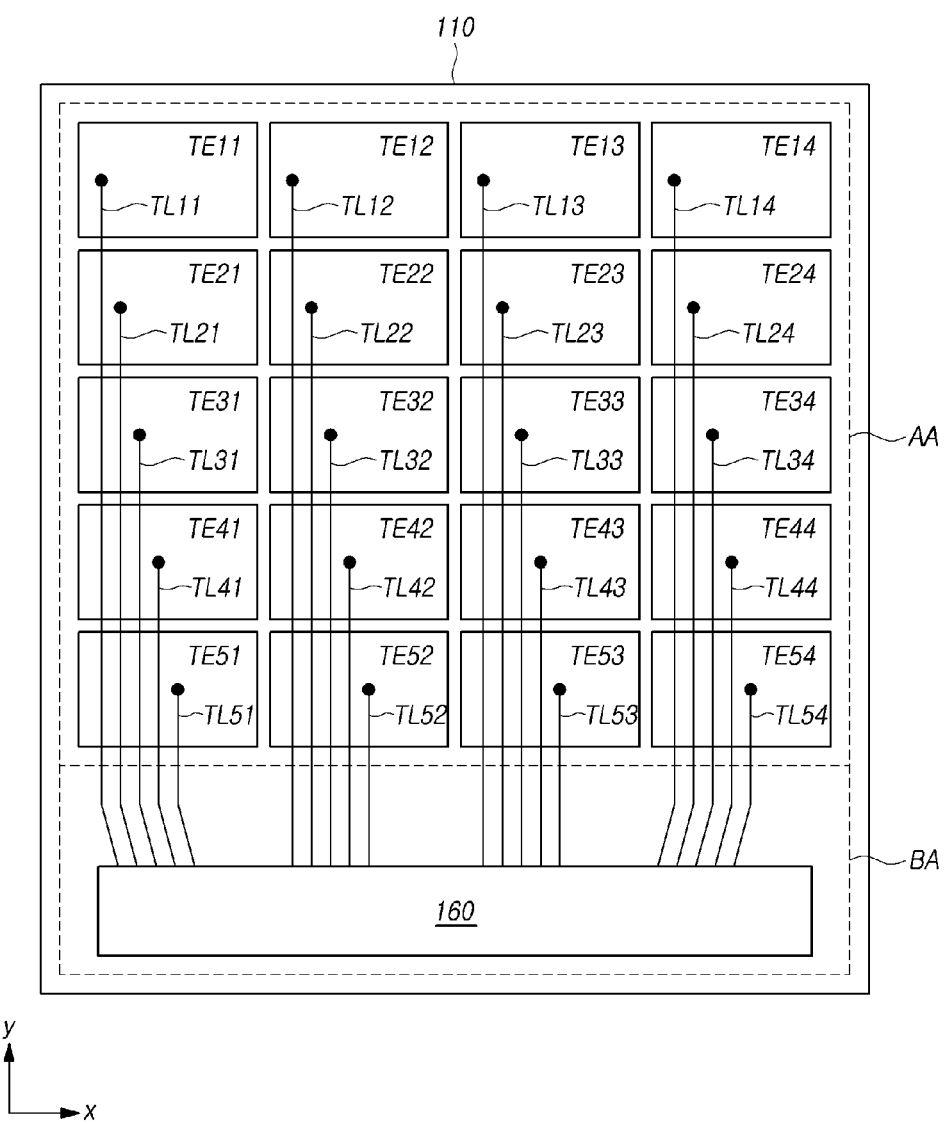
FIG. 8 illustrates a diagram of a case in which a touch sensing method based on self-capacitance is applied in the display device according to an embodiment of the present disclosure.

FIG. 8 illustrates a diagram of a case in which a touch sensing method based on self-capacitance is applied in the display device according to an embodiment of the present disclosure.

Referring to FIG. 8, the display device 100 to which the touch sensing scheme based on self-capacitance is applied according to an embodiment of the present disclosure includes a display panel 110 on which a plurality of touch electrodes TE and a plurality of touch lines TL are arranged, and a touch driving circuit 160 providing touch driving signals TDS to the touch electrodes TE and receiving touch sensing signals TSS from the touch electrodes TE.

The display device 100 may include an active area AA in which the plurality of touch electrodes TE11-TE54 are arranged and a bezel area BA, located outside of the active area AA, on which the touch driving circuit 160 is arranged.

Here, an example of the touch electrodes TE arranged in 5 rows and 4 columns in the display panel 110 is discussed. However, this is just one example for convenience of description. For example, touch electrodes TE may be arranged in various structures in the display panel 110.

The plurality of touch electrodes TE11-TE54 are arranged in a row direction and a column direction intersecting in the active area AA, and a plurality of touch lines TL11-TL54 are connected to the plurality of touch electrodes TE11-TE54, respectively. The plurality of touch lines TL11-TL54 extends to the bezel area BA from the active area AA in the column direction and is connected to the touch driving circuit 160.

More specifically, a 1-1 touch line TL11 is connected to a touch electrode TE11 in a first row and a first column. The 1-1 touch line TL11 extends to the bezel area BA from the active area AA in the column direction and is connected to the touch driving circuit 160. Further, a 2-1 touch line TL21 is connected to a touch electrode TE21 in a second row and the first column. The 2-1 touch line TL21 extends to the bezel area BA from the active area AA in parallel with the 1-1 touch line TL11 and is connected to the touch driving circuit 160. Likewise, a 3-1 touch line TL31 connected to a touch electrode TE31 in a third row and the first column, a 4-1 touch line TL41 connected to a touch electrode TE41 in a fourth row and the first column, and a 5-1 touch line TL51 connected to a touch electrode TE51 in a fifth row and the first column extend to the bezel area BA from the active area AA in parallel with the 1-1 touch line TL11 and the 2-1 touch line TL21, and are connected to the touch driving circuit 160.

Likewise, a touch electrode TE12 in the first row and a second column to a touch electrode TE52 in the fifth row and the second column, which are arranged in the second column, are connected to a 1-2 touch line TL12 to a 5-2 touch line TL52, respectively. The 1-2 touch line TL12 to the 5-2 touch line TL52 extend to the bezel area BA from the active area AA in parallel with one another, and are connected to the touch driving circuit 160.

Further, a touch electrode TE13 in the first row and a third column to a touch electrode TE53 in the fifth row and the third column, which are arranged in the third column, are also connected to a 1-3 touch line TL13 to a 5-3 touch line TL53, respectively. The 1-3 touch line TL13 to the 5-3 touch line TL53 extend to the bezel area BA from the active area AA in parallel with one another, and are connected to the touch driving circuit 160.

Further, a touch electrode TE14 in the first row and a fourth column to a touch electrode TE54 in the fifth row and the fourth column, which are arranged in the fourth column, are also connected to a 1-4 touch line TL14 to a 5-4 touch line TL54, respectively. The 1-4 touch line TL14 to the 5-4 touch line TL54 extend to the bezel area BA from the active area AA in parallel with one another, and are connected to the touch driving circuit 160.

In the case of the display device 100 that is the organic light emitting display device, a plurality of touch electrodes TE are included in the display panel 110, and may be arranged on an encapsulation layer located over a transistor and an organic light emitting diode. Such an arrangement of the touch electrodes TE may be more suitable for the top emission structure.

In the case of the display device 100 that is the organic light emitting display device, the plurality of touch electrodes TE may be arranged on a substrate of the display panel 110, on which a thin film transistor (TFT) is disposed. For example, the plurality of touch electrodes TE may be an anode electrode of an organic light emitting diode included in the display panel 110, an electrode formed on a layer equal to the anode electrode, or an electrode located on at least one of various layers located over or under the anode electrode. Like this, a configuration in which the touch electrode TE is disposed over the substrate on which the thin film transistor is formed is more suitable for a case where the display panel 110 has the bottom emission structure.

A plurality of touch electrodes TE included in the touch display device 100 according to an embodiment of the present disclosure may be formed in a plate type not having an opening, or a mesh type having openings for luminous efficiency of a subpixel. The plurality of touch electrodes TE may be transparent electrodes, or further include one or more transparent electrodes for luminous efficiency of subpixels.

The plurality of touch electrodes TE included in the touch display device 100 according to an embodiment of the present disclosure may be electrodes for touch sensing, or electrodes used for both display driving and the touch sensing.

As described above, in the case of the display device 100 to which the touch sensing method based on self-capacitance is applied, the touch line TL may be arranged in the active area AA since the touch line TL is extended from the touch electrode TE arranged in the active area AA and connected to the touch driving circuit 160.

In this case, the touch line TL connected to the driving voltage line DVL in the active area AA may be used as the driving voltage feedback line EVDD_FBL for detecting the subpixel driving voltage EVDD.

The touch driving circuit 160 senses the presence of a touch and a touch position on the display panel 110. The touch driving circuit 160 may include a driving circuit that generates a touch driving signal to drive the touch electrode TE and a sensing circuit that processes the touch sensing signal to detect the presence of a touch and coordinate information. The driving circuit and the sensing circuit of the touch driving circuit 160 may be implemented in the form of a single integrated circuit called a read out integrated circuit (ROIC) or may be separated by function.

Meanwhile, a source driving integrated circuit SDIC implementing the data driving circuit 130 and a readout integrated circuit (ROIC) implementing the touch driving circuit 160 may be combined into one integrated circuit to form a combined integrated circuit (SRIC).

A source driving integrated circuit (SDIC), a readout integrated circuit (ROIC), and a combined integrated circuit (SRIC) may be collectively referred to as a driving integrated circuit. Also, the data driving circuit 130 and the touch driving circuit 160 may be collectively referred to as a driving circuit.

Accordingly, in the display device 100 to which the touch sensing method is applied, if the subpixel driving voltage EVDD detected through the driving voltage feedback line EVDD_FBL connected to the driving voltage line DVL in the plurality of areas of the display panel 110 is transmitted to the driving circuit in which the data driving circuit 130 and the touch driving circuit 160 are combined, the driving circuit may detect the deviation of the subpixel driving voltage EVDD depending on positions in the display panel 110 to compensate the data voltage Vdata.

Figure 9:
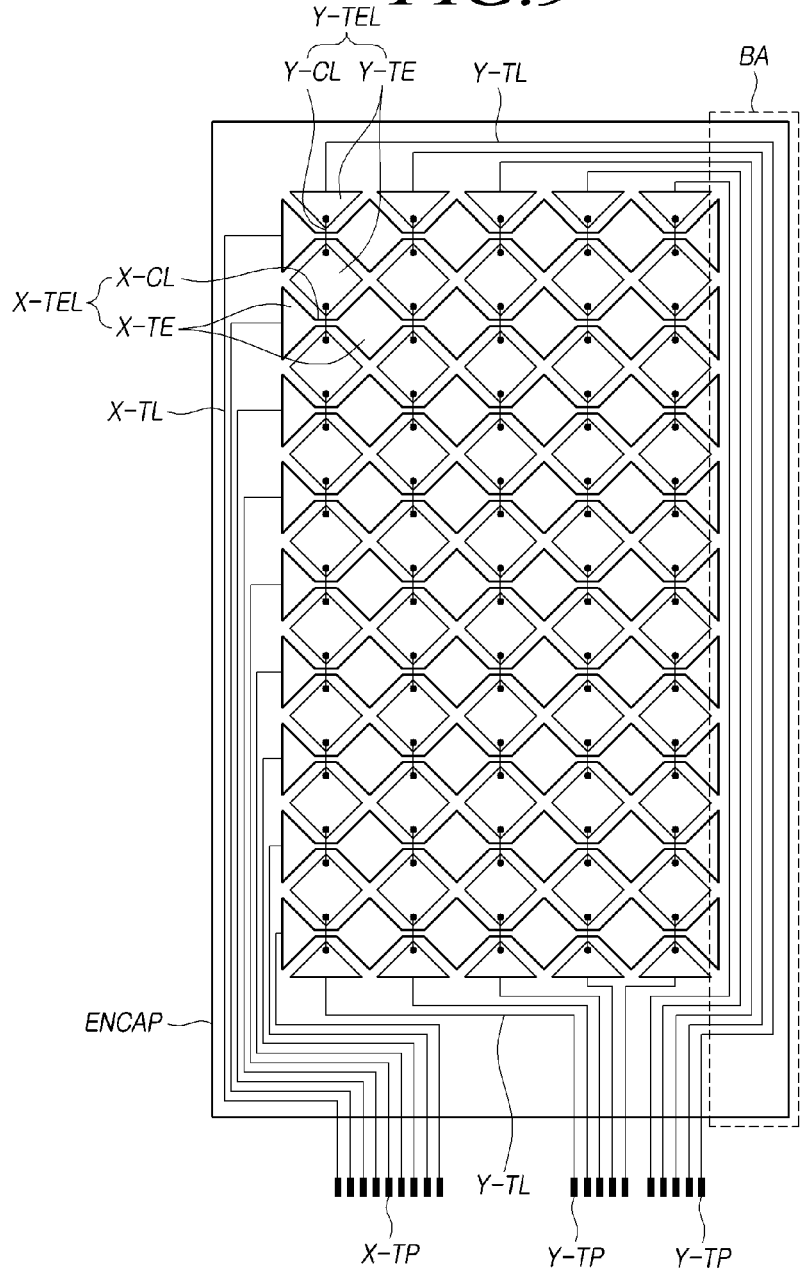
FIG. 9 illustrates a diagram of a case in which a touch sensing method based on mutual-capacitance is applied in the display device according to an embodiment of the present disclosure.

FIG. 9 illustrates a diagram of a case in which a touch sensing method based on mutual-capacitance is applied in the display device according to an embodiment of the present disclosure.

Referring to FIG. 9, the touch sensor structure based on mutual-capacitance according to an embodiment of the present disclosure may include a plurality of X-touch electrode lines X-TEL and a plurality of Y-touch electrode lines Y-TEL. In this regard, the plurality of X-touch electrode lines X-TEL and the plurality of Y-touch electrode lines Y-TEL are arranged on an encapsulation layer ENCAP.

Each of the plurality of X-touch electrode lines X-TEL may be arranged in a first direction, and each of the plurality of Y-touch electrode lines Y-TEL may be arranged in a second direction that is different from the first direction.

Each of the plurality of X-touch electrode lines X-TEL may include a plurality of X-touch electrodes X-TE that are electrically connected. Each of the plurality of Y-touch electrode lines Y-TEL may include a plurality of Y-touch electrodes Y-TE that are electrically connected.

The plurality of X-touch electrodes X-TE and the plurality of Y-touch electrodes Y-TE are included in the plurality of touch electrodes TE such that the roles (functions) thereof are distinguished. For example, the plurality of X-touch electrodes X-TE constituting each of the plurality of X-touch electrode lines X-TEL may be touch driving electrodes, and the plurality of Y-touch electrodes Y-TE constituting each of the plurality of Y-touch electrode lines Y-TEL may be touch sensing electrodes. In this case, each of the plurality of X-touch electrode lines X-TEL corresponds to a touch driving electrode line, and each of the plurality of Y-touch electrode lines Y-TEL corresponds to a touch sensing electrode line.

To the contrary, the plurality of X-touch electrodes X-TE constituting each of the plurality of X-touch electrode lines X-TEL may be touch sensing electrodes, and the plurality of Y-touch electrodes Y-TE constituting each of the plurality of Y-touch electrode lines Y-TEL may be touch driving electrodes. In this case, each of the plurality of X-touch electrode lines X-TEL corresponds to a touch sensing electrode line, and each of the plurality of Y-touch electrode lines Y-TEL corresponds to a touch driving electrode line.

The touch sensor metal for touch sensing may include a plurality of touch lines TL for connecting the touch electrode lines X-TEL, Y-TEL to the touch driving circuit 160 as well as the plurality of X-touch electrode lines X-TEL and the plurality of Y-touch electrode lines Y-TEL.

The plurality of touch lines TL may include at least one X-touch line X-TL connected to the plurality of X-touch electrode lines X-TEL and at least one Y-touch line Y-TL connected to the plurality of Y-touch electrode lines Y-TEL.

Each of the plurality of X-touch electrode lines X-TEL may include a plurality of X-touch electrodes X-TE arranged in the same row (or column) and at least one X-touch electrode connection line X-CL connecting electrically them. A X-touch electrode connection line X-CL connecting two adjacent X-touch electrodes X-TE may be a metal integrated with the two adjacent X-touch electrodes X-TE or may be a metal connected to the two adjacent X-touch electrodes X-TE through a contact hole.

The plurality multiple Y-touch electrode lines Y-TEL may include a plurality of Y-touch electrodes Y-TE arranged in the same column (or row) and at least one Y-touch electrode connection line Y-CL connecting electrically them. A Y-touch electrode connection line Y-CL connecting two adjacent Y-touch electrodes Y-TE may be a metal integrated with the two adjacent Y-touch electrodes Y-TE or may be a metal connected to the two adjacent Y-touch electrodes Y-TE through a contact hole.

In an area in which a X-touch electrode line X-TEL and a Y-touch electrode line Y-TEL intersect (an intersection area of touch electrode lines), the X-touch electrode connection line X-CL and the Y-touch electrode connection line Y-CL may intersect.

When a X-touch electrode connection line X-CL and a Y-touch electrode connection line Y-CL intersect in an intersection area of touch electrode lines, the X-touch electrode connection line X-CL and the Y-touch electrode connection line Y-CL are arranged on different layers according to one embodiment. Accordingly, in order for the plurality of X-touch electrode lines X-TEL and the plurality of Y-touch electrode lines Y-TEL to be arranged so as to intersect, the plurality of X-touch electrodes X-TE, the plurality of X-touch electrode connection lines X-CL, the plurality of Y-touch electrodes Y-TE, and the plurality of Y-touch electrode connection lines Y-CL may be arranged on at least two layers.

The plurality of X-touch electrode lines X-TEL are electrically connected to the corresponding X-touch pad X-TP through at least one X-touch line X-TL. That is, the X-touch electrode X-TE arranged on the most outside among the plurality of X-touch electrodes X-TE included in one X-touch electrode line X-TEL is electrically connected to the corresponding X-touch pad X-TP through a X-touch line X-TL extended to the bezel area BA.

The plurality of Y-touch electrode lines Y-TEL are electrically connected to the corresponding Y-touch pad Y-TP through at least one Y-touch line Y-TL. That is, the Y-touch electrode Y-TE arranged the most outside among the plurality of Y-touch electrodes Y-TE included in one Y-touch electrode line Y-TEL is electrically connected to the corresponding Y-touch pad Y-TP through a Y-touch line Y-TL extended to the bezel area BA.

As described above, in the case of the display device 100 to which the touch sensing method based on mutual-capacitance is applied, the touch lines X-TL, Y-TL may be arranged in the active area AA sine they are connected to the touch driving circuit 160 by being extended from the touch electrode TE disposed in the active area AA through the bezel area BA.

In this case, the touch line TL extending through the bezel area BA may be used as the driving voltage feedback line EVDD_FBL for detecting the subpixel driving voltage EVDD through the driving voltage line DVL.

As described above, the touch driving circuit 160 may be separated from the data driving circuit 130. Otherwise, the source driving integrated circuit SDIC implementing the data driving circuit 130 and the readout integrated circuit (ROIC) implementing the touch driving circuit 160 may be combined into one combined integrated circuit (SRIC).

Accordingly, in the display device 100 to which the touch sensing method based on mutual-capacitance is applied, if the subpixel driving voltage EVDD is transmitted to the driving circuit through the driving voltage feedback line EVDD_FBL which is connected to the driving voltage line DVL in the plurality of areas of the display panel 110 and extended through the bezel area BA, the driving circuit may compensate the data voltage Vdata by detecting the deviation of the subpixel driving voltage EVDD depending on positions in the display panel 110.

Figure 10:
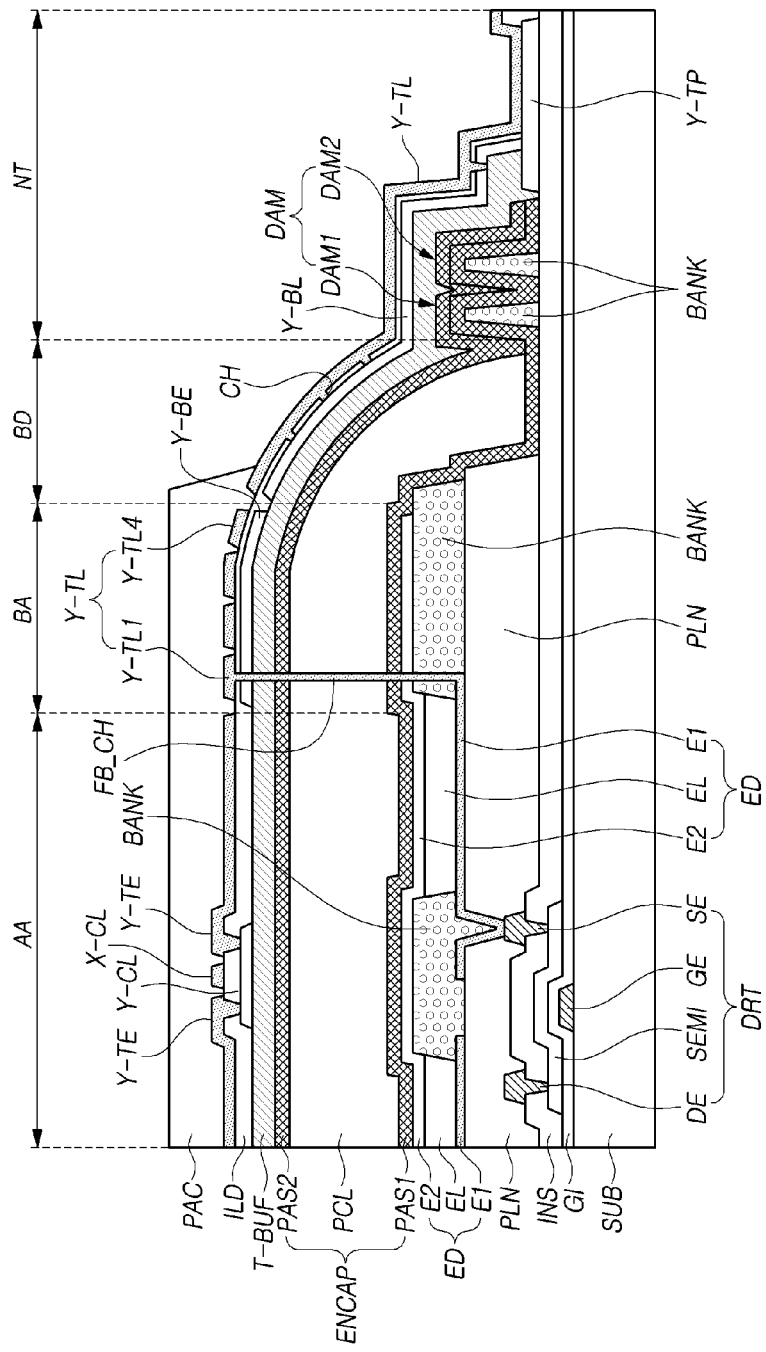
FIG. 10 illustrates a diagram of a cross-section in the case of connecting to a driving voltage line using a touch line as a driving voltage feedback line in the display device according to an embodiment of the present disclosure.

FIG. 10 illustrates a diagram of a cross-section in the case of connecting to a driving voltage line using a touch line as a driving voltage feedback line in the display device according to an embodiment of the present disclosure.

Referring to FIG. 10, in the display device 100 according to an exemplary embodiment of the present disclosure, a driving transistor DRT in the subpixel SP located in the active area AA may be arranged on a substrate SUB.

The driving transistor DRT may include a gate electrode GE, a source electrode SE, a drain electrode DE, and a semiconductor layer SEMI.

The gate electrode GE and the semiconductor layer SEMI may overlap each other with a gate insulating film GI interposed therebetween. The source electrode SE may be arranged on an insulating layer INS so as to contact one side of the semiconductor layer SEMI, and the drain electrode DE may be arranged on the insulating layer INS so as to contact the other side of the semiconductor layer SEMI.

The light emitting element ED may include a first electrode E1 corresponding to an anode electrode (or a cathode electrode), a light emitting layer EL arranged on the first electrode E1, and a second electrode E2 corresponding to a cathode electrode (or an anode electrode) arranged on the light emitting layer EL.

The first electrode E1 is electrically connected to the source electrode SE of the driving transistor DRT, which is exposed through a pixel contact hole that penetrates a planarization film PLN.

The light emitting layer EL is arranged on a first electrode E1 of a light emitting area provided by a bank BANK. The light emitting layer EL may be formed by laminating a hole-related layer, the light emitting layer, and an electron-related layer on the first electrode E1 in this order or in the reverse order. The second electrode E2 may be arranged to face the first electrode E1 with the light emitting layer EL interposed therebetween.

The encapsulation layer ENCAP prevents external moisture or oxygen from infiltrating the light emitting element ED, which is vulnerable to external moisture or oxygen. The encapsulation layer ENCAP may include a single layer or may include a plurality of layers PAS1, PCL, PAS2.

For example, when the encapsulation layer ENCAP includes a plurality of layers PAS1, PCL, PAS2, the encapsulation layer ENCAP may include at least one inorganic encapsulation layer PAS1, PAS2 and at least one organic encapsulation layer PCL. As a specific example, the encapsulation layer ENCAP may be structured to include a first inorganic encapsulation layer PAS1, an organic encapsulation layer PCL, and a second inorganic encapsulation layer PAS2 laminated successively.

The organic encapsulation layer PCL may further include at least one organic encapsulation layer or at least one inorganic encapsulation layer.

The first inorganic encapsulation layer PAS1 is arranged on the substrate SUB, on which a second electrode E2 corresponding to a cathode electrode is formed, to be most adjacent to the light emitting element ED. The first inorganic encapsulation layer PAS1 is, for example, made of an inorganic insulation material that can be deposited at a low temperature, such as silicon nitride (SiNx), silicon oxide (SiOx), silicon oxynitride (SiON), or aluminum oxide ($Al_2O_3$). Since the first inorganic encapsulation layer PAS1 is deposited at a low temperature, the first inorganic encapsulation layer PAS1 may prevent or at least reduce damage to the light emitting layer EL including an organic material that is vulnerable to a high temperature during a deposition process.

The organic encapsulation layer PCL may be formed to have an area smaller than the first inorganic encapsulation layer PAS1. In this case, the organic encapsulation layer PCL may be formed to expose both ends of the first inorganic encapsulation layer PAS1. The organic encapsulation layer PCL may have a role of buffering stress between respective layers as a result of bending of the display device 100, and may have a role of enhancing the planarization performance. For example, the organic encapsulation layer PCL may be made of an organic insulation material, such as acrylic resin, epoxy resin, polyimide, polyethylene, or silicon oxycarbide (SiOC).

When the organic encapsulation layer PCL is formed in an inkjet method, one dam or at least two dams DAM may be arranged in the boundary area between the bezel area BA and the active area AA or in a dam area corresponding to a partial area in the non-active area (bezel area BA, bending area BA, and notch area NT).

For example, the dam area may be located between the active area AA and a pad area in which a plurality of touch pads TP are arranged in the non-active area and, a primary dam DAM1 that is adjacent to the active area AA and a secondary dam DAM2 that is adjacent to the pad area may exist in the dam area.

When a liquid type organic encapsulation layer PCL is formed in the active area AA, the at least one dam DAM arranged in the dam area may prevent the liquid type organic encapsulation layer PCL from collapsing toward the non-active area and infiltrating the pad area.

The primary dam DAM1 or the secondary damp DAM2 may be formed in a structure of a single layer or multi-layer. For example, the primary dam DAM1 or the secondary damp DAM2 may be simultaneously formed with the same material as that of at least one among the bank BANK and the spacer (not illustrated). In this case, a dam structure may be formed without a process of adding a mask and without increasing the cost.

The primary dam DAM1 or the secondary damp DAM2 may have a structure that the first inorganic encapsulation layer PAS1 and the second inorganic encapsulation layer PAS2 are laminated on the bank BANK. The organic encapsulation layer PCL including an organic material may be arranged on the inner portion of the primary dam DAM1, or arranged on the upper portion of at least a part of the primary dam DAM1 and the secondary dam DAM2.

The second inorganic encapsulation layer PAS2 may be formed to cover the upper surface and side surface of each of the organic encapsulation layer PCL and the first inorganic encapsulation layer PAS1 on the substrate SUB on which the organic encapsulation layer PCL is formed. The second inorganic encapsulation layer PAS2 reduces or blocks infiltration of external moisture or oxygen into the first inorganic encapsulation layer PAS1 and the organic encapsulation layer PCL. For example, the second inorganic encapsulation layer PAS2 is made of an inorganic insulation material such as silicon nitride (SiNx), silicon oxide (SiOx), silicon oxynitride (SiON), or aluminum oxide (Al2O3).

A touch buffer layer T-BUF may be arranged on the encapsulation layer ENCAP. The touch buffer layer T-BUF may be arranged between a touch sensor metal including touch electrodes X-TE, Y-TE and touch electrode connection lines X-CL, Y-CL, and the second electrode E2 of the light emitting element ED.

The touch buffer layer T-BUF may be designed such that a spacing distance between the touch sensor metal and the second electrode E2 of the light emitting element ED maintains a predetermined minimum spacing distance (for example, 1 μm). This may reduce or prevent the parasitic capacitance formed between the touch sensor metal and the second electrode E2 of the light emitting element ED, thereby preventing or at least reducing degradation of touch sensitivity caused by the parasitic capacitance.

On the other hand, it also possible to arrange a touch sensor metal including touch electrodes X-TE, Y-TE, and touch electrode connection lines X-CL, Y-CL on the encapsulation layer ENCAP, without the touch buffer layer T-BUF.

The touch buffer layer T-BUF may also block infiltration of a liquid chemical (development liquid, etching liquid, or the like) used during a process of manufacturing the touch sensor metal arranged on the touch buffer layer T-BUF or external moisture into the light emitting layer EL including an organic material. As such, the touch buffer layer T-BUF may diminish damage to the light emitting layer EL which is vulnerable to liquid chemicals or moisture.

The touch buffer layer T-BUF is made of an organic insulation material which can be formed at a low temperature equal to or lower than a predetermined temperature (for example, 100° C.) and has a low permittivity, in order to prevent damage to the light emitting layer EL including an organic material which is vulnerable to a high temperature. For example, the touch buffer layer T-BUF may be made of an acrylate-based material, an epoxy-based material, or a siloxane-based material. The touch buffer layer T-BUF, which is made of an organic insulation material and thus has a planarization performance, may diminish damage to inner layers PAS1, PCL, PAS2 constituting the encapsulation layer ENCAP and fracture of the touch sensor metal formed on the touch buffer layer T-BUF as a result of bending of the organic light emitting display device.

In a case of the touch sensor structure based on mutual-capacitance, the X-touch electrode line X-TEL and the Y-touch electrode line Y-TEL may be arranged on the touch buffer layer T-BUF, and the X-touch electrode line X-TEL and the Y-touch electrode line Y-TEL may be arranged so as to intersect. The Y-touch electrode line Y-TEL may include a plurality of Y-touch electrode connection lines Y-CL that electrically connect between the plurality of Y-touch electrodes Y-TE.

The plurality of Y-touch electrodes Y-TE and the plurality of Y-touch electrode connection lines Y-CL may be arranged on different layers with the interlayer dielectric ILD interposed therebetween.

Each of the plurality of Y-touch electrodes Y-TE may be spaced apart with each other by a predetermined interval along the y-axis direction. The plurality of Y-touch electrodes Y-TE may be electrically connected to a different Y-touch electrode Y-TE that is adjacent in the y-axis direction through a Y-touch electrode connection line Y-CL.

The Y-touch electrode connection line Y-CL may be arranged on the touch buffer layer T-BUF and exposed through a touch contact hole that penetrates the interlayer dielectric ILD to be electrically connected to two Y-touch electrodes Y-TE that are adjacent in the y-axis direction.

The Y-touch electrode connection line Y-CL may be arranged so as to overlap with the bank BANK. This may diminish degradation of the aperture ratio due to the Y-touch electrode connection line Y-CL.

The X-touch electrode line X-TEL may include a plurality of X-touch electrode connection lines X-CL that electrically connect between the plurality of X-touch electrodes X-TE. The plurality of X-touch electrodes X-TE and the plurality of X-touch electrode connection lines X-CL may be arranged on different layers with the interlayer dielectric ILD interposed therebetween.

Each of the plurality of X-touch electrodes X-TE may be spaced apart by a predetermined interval along the x-axis direction on the interlayer dielectric ILD. The plurality of X-touch electrodes X-TE may be electrically connected to a different X-touch electrode X-TE that is adjacent in the x-axis direction through an X-touch electrode connection line X-CL.

The X-touch electrode connection line X-CL may be arranged on the same plane with the X-touch electrodes X-TE and electrically connected to two X-touch electrodes X-TE that are adjacent in the x-axis direction without a separate contact hole, or may be integrated with two X-touch electrodes X-TE that are adjacent in the x-axis direction.

The X-touch electrode connection line X-CL may be arranged so as to overlap with the bank BANK. This may diminish degradation of the aperture ratio due to the X-touch electrode connection line X-CL.

The Y-touch electrode lines Y-TEL may be electrically connected to the touch driving circuit 160 through a Y-touch line Y-TL and a Y-touch pad Y-TP. Likewise, the X-touch electrode lines X-TEL may be electrically connected to the touch driving circuit 160 through an X-touch line X-TL and an X-touch pad X-TP.

A pad cover electrode may be additionally arranged to cover the X-touch pad X-TP and the Y-touch pad Y-TP.

The X-touch pad X-TP may be formed separately from the X-touch line X-TL or may be formed by extension of the X-touch line X-TL. The Y-touch pad Y-TP may be formed separately from the Y-touch line Y-TL or may be formed by extension of the Y-touch line Y-TL.

When the X-touch pad X-TP is formed by extension from the X-touch line X-TL and the Y-touch pad Y-TP is formed by extension from the Y-touch line Y-TL, the X-touch pad X-TP, the X-touch line X-TL, the Y-touch pad Y-TP, and the Y-touch line Y-TL may be made of the same first conductive material. Here, the first conductive material may be formed in a single layer or multi-layer structure using, for example, a metal which has high corrosion resistance, high acid resistance, and excellent conductivity, such as Al, Ti, Cu, and Mo.

For example, the X-touch pad X-TP, the X-touch line X-TL, the Y-touch pad Y-TP, and the Y-touch line Y-TL, which are made of the first conductive material, may be formed in a three-layer structure including laminated Ti/Al/Ti or Mo/Al/Mo.

The pad cover electrode capable of covering the X-touch pad X-TP and the Y-touch pad Y-TP may be made of a second conductive material that is identical to the material of the X-touch electrode X-TE and Y-touch electrodes Y-TE. The second conductive material may be a transparent conductive material having high corrosion resistance and high acid resistance, such as ITO or IZO. The pad cover electrode may be formed to be exposed by the touch buffer layer T-BUF such that it is bonded to the touch driving circuit 160 or bonded to a circuit film on which the touch driving circuit 160 is mounted.

The touch buffer layer T-BUF may be formed to cover the touch sensor metal to prevent the touch sensor metal from being corroded by external moisture or the like. For example, the touch buffer layer T-BUF may be made of an organic insulation material, a circular polarizing plate, an epoxy-based or acrylate-based film. The touch buffer layer T-BUF may not exist on the encapsulation layer ENCAP. That is, the touch buffer layer T-BUF may not be an essential element.

The Y-touch line Y-TL may be electrically connected to the Y-touch electrode Y-TE through a touch line contact hole or may be integrated with the Y-touch electrode Y-TE.

The Y-touch line Y-TL may extend to the bezel area BA and be electrically connected to the Y-touch pad Y-TP through the upper and side surface of the encapsulation layer ENCAP and the upper and side surface of the dam DAM. Accordingly, the Y-touch line Y-TL may be electrically connected to the touch driving circuit 160 through the Y-touch pad Y-TP.

The Y-touch line Y-TL may transmit a touch sensing signal from the Y-touch electrode Y-TE to the touch driving circuit 160, or may transmit a touch driving signal from the touch driving circuit 160 to the Y-touch electrode Y-TE.

At this time, a Y-touch bridge line Y-BL may be arranged to connect to a contact hole CH under the Y-touch line Y-TL in the notch area NT and the bending area BD. Since the Y-touch line Y-TL and the Y-touch bridge line Y-BL are electrically connected to at least one contact hole CH formed at regular intervals, the same touch driving signal or touch sensing signal may be transmitted.

As such, when the Y-touch line Y-TL and the Y-touch bridge line Y-BL are electrically connected, the electrical resistance may be reduced in the process of transmitting the touch driving signal or the touch sensing signal. In addition, when the Y-touch line Y-TL and the Y-touch bridge line Y-BL are connected through the plurality of contact holes CH, touch sensing performance may be maintained since the touch signal (touch driving signal or touch sensing signal) may be bypassed through the contact hole CH even if the Y-touch line Y-TL or Y-touch bridge line is disconnected in some area.

The Y-touch line Y-TL and the Y-touch bridge line may be insulated in some area other than the contact hole CH by the interlayer dielectric ILD disposed therebetween.

On the other hand, a plurality of Y-touch lines Y-TL1, Y-TL2, Y-TL3, Y-TL4 may be arranged in the bezel area BA, and a Y-touch bridge electrode Y-BE with an integral structure may be arranged under them.

The Y-touch bridge electrode Y-BE has an integrated structure, and the width of the Y-touch bridge electrode Y-BE may be equal to or wider than the Y-touch lines Y-TL1, Y-TL2, Y-TL3, Y-TL4 to cover the area arranged by the Y-touch lines Y-TL1, Y-TL2, Y-TL3, Y-TL4 on the upper area.

At this time, the Y-touch bridge electrode Y-BE is connected to the ground voltage GND so as to discharge the noise charge flowing into the display panel 110, and is separated from the touch bridge line Y-BL arranged in the bending area BD.

Accordingly, a noise charge flowing into the display panel 110 may be easily discharged to the ground GND through the Y-touch bridge electrode Y-BE formed as an integral structure to cover the area of the Y-touch lines Y-TL1, Y-TL2, Y-TL3, Y-TL4. As a result, it is possible to improve the touch sensing performance of the display device 100 and reduce defects caused by display driving operation.

The X-touch routing line X-TL may be electrically connected to the X-touch electrode X-TE through a touch line contact hole or integrated with the X-touch electrode X-TE.

The X-touch line X-TL may be extended to the bezel area BA and be electrically connected to the X-touch pad X-TP through the upper and side surface of the encapsulation layer ENCAP, and the upper and side surface of the dam DAM. Accordingly, the X-touch line X-TL may be electrically connected to the touch driving circuit 160 through the X-touch pad X-TP.

The X-touch line X-TL may transmit a touch driving signal from the touch driving circuit 160 to the X-touch electrode X-TE, and may transmit a touch sensing signal from the X-touch electrode X-TE to the touch driving circuit 160.

The arrangement of the X-touch line X-TL and the Y-touch line Y-TL may be modified according to panel design requirements.

In this structure, the X-touch line X-TL or the Y-touch line Y-TL may be electrically connected to the driving voltage line DVL through a feedback contact hole FB_CH in order to use the X-touch line X-TL or the Y-touch line Y-TL as the driving voltage feedback line EVDD_FBL in the bezel area BA or the active area AA.

The driving voltage feedback line EVDD_FBL may be connected to the source electrode SE or the drain electrode DE of the driving transistor DRT. Here, it illustrates a case, as an example, the driving voltage feedback line EVDD_FBL is electrically connected to the source electrode SE of the driving transistor DRT through the first electrode E1 corresponding to the anode electrode of the light emitting element ED.

A touch protective film PAC may be arranged on the X-touch electrode X-TE and the Y-touch electrode Y-TE. The touch protective film PAC may extend to the front or rear side of the dam DAM so as to be arranged on the X-touch line X-TL and the Y-touch line Y-TL as well.

As described above, when the touch line TL is used as the driving voltage feedback line EVDD_FBL, a period in which the touch driving signal or the touch sensing signal is transmitted through the touch line TL may be separated in time from a period in which the subpixel driving voltage EVDD is transmitted.

Figure 11:
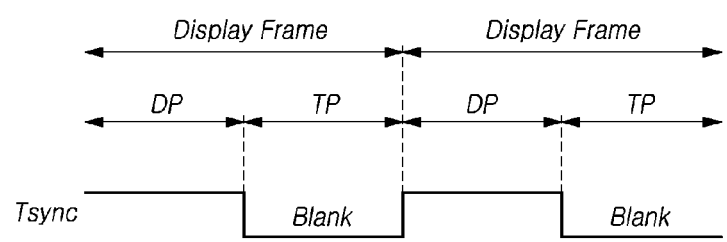
FIG. 11 illustrates a timing diagram for configuring a display driving period and a touch driving period in the display device according to embodiments of the present disclosure.

FIG. 11 illustrates a timing diagram for configuring a display driving period and a touch driving period in the display device according to embodiments of the present disclosure.

Referring to FIG. 11, the display device 100 according to embodiments of the present disclosure performs display driving operation for displaying images during the predefined display driving period DP within one display frame, and performs touch driving operation for sensing a touch input from a finger or a stylus during the predefined touch driving period TP.

The display driving period DP and the touch driving period TP may be separated from each other in time. Such a driving method may be referred to as a time-division driving.

In the time-division driving operation, the display driving period DP and the touch driving period TP may be alternately arranged.

Thus, when the display driving period DP and the touch driving period TP are separated in time while alternately being arranged, the touch driving period TP may correspond to a blank period Blank in which the display driving operation is not performed.

The display device 100 may generate a touch synchronization signal Tsync that swings between a high level and a low level, and through this, may identify or control the display driving period DP and the touch driving period TP. That is, the touch synchronization signal Tsync may be a timing control signal for defining the touch driving period TP.

For example, a high level period (or a low level period) of the touch synchronization signal Tsync may correspond to the display driving period DP, and the low level period (or the high level period) of the touch synchronization signal Tsync may correspond to the touch driving period TP.

In this case, the driving circuit supplies the touch driving signal to the touch electrode TE during the touch driving period TP in which the touch synchronization signal Tsync is at the low level, and sense the touch presence and a touch coordinate of a passive stylus or an active stylus by using a touch signal received from the touch electrode TE.

Meanwhile, with respect to methods of assigning the display driving period DP and the touch driving period TP in one display frame period, for example, one display frame period may be divided into one display driving period DP and one touch driving period TP. A display driving operation may be performed during one display driving period DP, and a touch driving operation for sensing a touch input from the passive stylus and the active stylus may be performed during one touch driving period TP corresponding to the blank period Blank.

In another example, one display frame period may be divided into two or more display driving periods DP and two or more touch driving periods TP. Display driving operations may be performed during two or more display driving periods DP in one display frame period, and touch driving operations for sensing once or two or more times a touch input from the passive stylus and the active stylus on all or at least a part of a display panel 110 may be performed during two or more touch driving periods TP in one display frame period.

Like this, when dividing one display frame period into two or more display driving periods DP and two or more touch driving periods TP, and then performing the display driving operations and the touch driving operations, each of two or more blank periods corresponding to two or more touch driving periods TP in one display frame period is sometimes referred to as a long horizontal blank ("LHB").

As described above, when the display driving period DP is separated from the touch driving period TP in time, the subpixel driving voltage EVDD is not overlapped with the touch signal since the period in which the touch signal is transmitted is separated from the period in which the subpixel driving voltage EVDD is transmitted in time even if the touch line TL is used as the driving voltage feedback line EVDD_FBL.

On the other hand, when the display driving period DP is overlapped with the touch driving period TP in time, the detection period of the subpixel driving voltage EVDD may be separated from the transmission period of the touch signal using a switch disposed between the driving voltage line DVL and the driving voltage feedback line EVDD_FBL.

Meanwhile, although it described a case of detecting the deviation of the subpixel driving voltage EVDD depending on positions in the display panel 110 above as an example, other driving voltages, for example, the source driving voltage or the gate driving voltage, used in the display device 100, may also be detected and compensated for by detecting a deviation depending on positions in the display panel 110.

Figure 12:
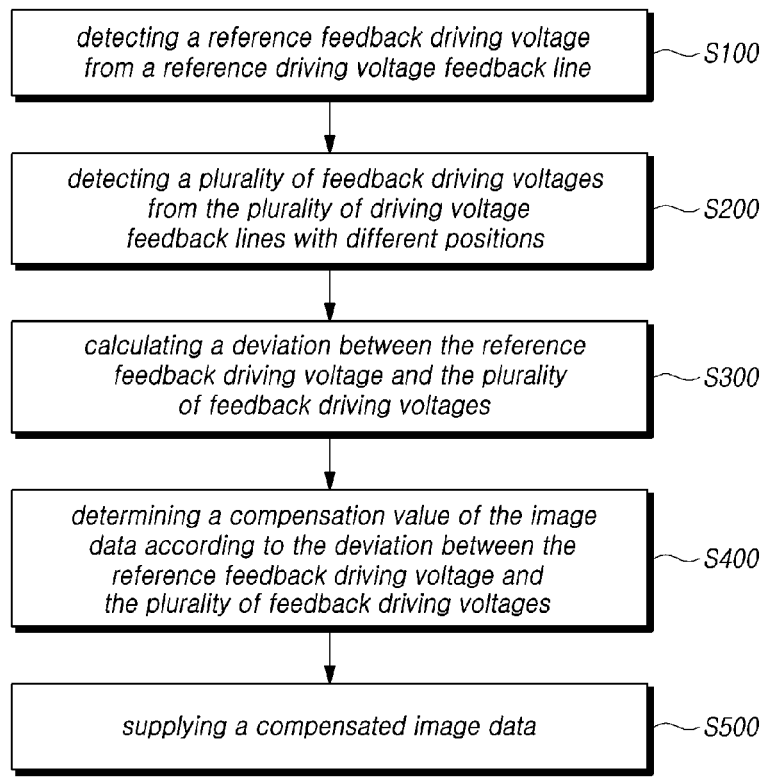
FIG. 12 illustrates a flowchart of a display driving method according to an embodiment of the present disclosure.

FIG. 12 illustrates a flowchart of a display driving method according to an embodiment of the present disclosure.

Referring to FIG. 12, a display driving method according to an embodiment of the present disclosure may include a step of detecting S100 a reference feedback driving voltage from a reference driving voltage feedback line EVDD_FBL1, a step of detecting S200 a plurality of feedback driving voltages from the plurality of driving voltage feedback lines EVDD_FBL2, EVDD_FBL3, EVDD_FBL4 with different positions, a step of calculating S300 a deviation between the reference feedback driving voltage and the plurality of feedback driving voltages, a step of determining S400 a compensation value of the image data DATA according to the deviation between the reference feedback driving voltage and the plurality of feedback driving voltages, and a step of supplying S500 a compensated image data DATA_comp.

The step of detecting S100 a reference feedback driving voltage from a reference driving voltage feedback line EVDD_FBL1 is a process of detecting a first feedback driving voltage through reference driving voltage feedback line EVDD_FBL1 connected to the common driving voltage line EVDD_CSL formed in the upper bezel area BA of the display panel 110.

The step of detecting S200 a plurality of feedback driving voltages from the plurality of driving voltage feedback lines EVDD_FBL2 is a process of detecting a second feedback driving voltage, a third feedback driving voltage, and a fourth feedback driving voltage through a second driving voltage feedback line EVDD_FBL2, a third driving voltage feedback line EVDD_FBL3, and a fourth driving voltage feedback line EVDD_FBL4 connected to a driving voltage line DVL in an upper area, an central area, and an lower area of the display panel 110.

The step of calculating S300 a deviation between the reference feedback driving voltage and the plurality of feedback driving voltages is a process of determining a deviation by comparing the reference feedback driving voltage and the plurality of feedback driving voltages in the differential amplifier circuit 138 of the driving circuit.

The step of determining S400 a compensation value of the image data DATA according to the deviation between the reference feedback driving voltage and the plurality of feedback driving voltages is a process of compensating the image data DATA by the timing controller 140 according to the deviation between the reference feedback driving voltage and the plurality of feedback driving voltages calculated by the differential amplifier circuit 138.

The step of supplying S500 a compensated image data DATA_comp is a process of supplying the compensated image data DATA_comp to the driving circuit by the timing controller 140 and supplying a data voltage Vdata corresponding to the compensated image data DATA_comp to the display panel 110 by the driving circuit.

A brief description of the embodiments of the present disclosure is as follows.

The display device 100 according to an embodiment of the present disclosure includes a display panel 110 in which a plurality of driving voltage feedback lines EVDD_FBL branched from a driving voltage line DVL for supplying a driving voltage to a plurality of subpixels SP are disposed, a driving circuit for supplying a data voltage Vdata to the plurality of subpixels SP and determining a deviation of a feedback driving voltage detected through the plurality of driving voltage feedback lines EVDD_FBL, and a timing controller 140 for compensating for image data DATA depending on positions at which the plurality of driving voltage feedback lines EVDD_FBL are branched in the display panel 110 based on the deviation of the feedback driving voltage, and supplying a compensated image data DATA_comp to the driving circuit.

The driving voltage line DVL includes a common driving voltage line EVDD_CSL arranged in a bezel area BA of the display panel 110 adjacent to the driving circuit.

The plurality of driving voltage feedback lines EVDD_FBL include a first driving voltage feedback line EVDD_FBL1 used as a reference driving voltage feedback line, a second driving voltage feedback line EVDD_FBL2 connected to the driving voltage line DVL in an upper area of the display panel 110, a third driving voltage feedback line EVDD_FBL3 connected to the driving voltage line DVL in a central area of the display panel 110, and a fourth driving voltage feedback line EVDD_FBL4 connected to the driving voltage line DVL in a lower area of the display panel 110.

The reference driving voltage feedback line is connected to the common driving voltage line EVDD_CSL.

The driving circuit includes a differential amplifier circuit 138 for comparing a plurality of feedback driving voltages detected through the reference driving voltage feedback line and a plurality of driving voltage feedback lines, and an analog-to-digital converter ADC for converting a differential voltage Vout generated from the differential amplifier circuit 138 into a digital signal.

The differential amplifier circuit 138 includes a first operational amplifier OP1 that the second driving voltage feedback line EVDD_FBL2 is connected to an inverting input terminal (−) through a first resistor R1, a second resistor R2 is connected between the inverting input terminal (−) and an output terminal, the reference driving voltage feedback line is connected to a non-inverting input terminal (+) through a third resistor R3, and a fourth resistor R4 is connected between the non-inverting input terminal (+) and a ground, a second operational amplifier OP2 that the third driving voltage feedback line EVDD_FBL3 is connected to an inverting input terminal (−) through a first resistor R1, a second resistor R2 is connected between the inverting input terminal (−) and an output terminal, the reference driving voltage feedback line is connected to a non-inverting input terminal (+) through a third resistor R3, and a fourth resistor R4 is connected between the non-inverting input terminal (+) and a ground, and a third operational amplifier OP3 that the fourth driving voltage feedback line EVDD_FBL4 is connected to an inverting input terminal (−) through a first resistor R1, a second resistor R2 is connected between the inverting input terminal (−) and an output terminal, the reference driving voltage feedback line is connected to a non-inverting input terminal (+) through a third resistor R3, and a fourth resistor R4 is connected between the non-inverting input terminal (+) and a ground.

The plurality of driving voltage feedback lines are electrically connected to a source node or a drain node of a driving transistor DRT in the subpixel SP.

The plurality of driving voltage feedback lines are connected to a plurality of touch electrodes TE disposed on the display panel 110 to transmit a touch signal.

The feedback driving voltage is detected during a display driving period DP in which the touch signal is not supplied to the plurality of driving voltage feedback lines.

The plurality of driving voltage feedback lines are extended to a bezel area BA located outside an active area AA on which an image is displayed through the plurality of subpixels SP.

The driving circuit includes a touch driving circuit 160 for transmitting a touch driving signal and receiving a touch sensing signal through the touch line.

A driving circuit according to an embodiment of the present disclosure includes a differential amplifier circuit 138 for comparing a plurality of feedback driving voltages detected through a plurality of driving voltage feedback lines EVDD_FBL branched from a driving voltage line DVL supplying a driving voltage in a plurality of predetermined areas in a display panel 110 including a plurality of subpixels SP, and an analog-to-digital converter ADC for converting a differential voltage Vout generated from the differential amplifier circuit 138 into a digital signal.

The plurality of driving voltage feedback lines EVDD_FBL include a first driving voltage feedback line EVDD_FBL1 used as a reference driving voltage feedback line, a second driving voltage feedback line EVDD_FBL2 connected to the driving voltage line DVL in an upper area of the display panel 110, a third driving voltage feedback line EVDD_FBL3 connected to the driving voltage line DL in a central area of the display panel 110, and a fourth driving voltage feedback line EVDD_FBL4 connected to the driving voltage line DVL in a lower area of the display panel 110.

The differential amplifier circuit 138 includes a first operational amplifier OP1 that the second driving voltage feedback line EVDD_FBL2 is connected to an inverting input terminal (−) through a first resistor R1, a second resistor R2 is connected between the inverting input terminal (−) and an output terminal, the reference driving voltage feedback line is connected to a non-inverting input terminal (+) through a third resistor R3, and a fourth resistor R4 is connected between the non-inverting input terminal (+) and a ground, a second operational amplifier OP2 that the third driving voltage feedback line EVDD_FBL3 is connected to an inverting input terminal (−) through a first resistor R1, a second resistor R2 is connected between the inverting input terminal (−) and an output terminal, the reference driving voltage feedback line is connected to a non-inverting input terminal (+) through a third resistor R3, and a fourth resistor R4 is connected between the non-inverting input terminal (+) and a ground, and a third operational amplifier OP3 that the fourth driving voltage feedback line EVDD_FBL4 is connected to an inverting input terminal (−) through a first resistor R1, a second resistor R2 is connected between the inverting input terminal (−) and an output terminal, the reference driving voltage feedback line is connected to a non-inverting input terminal (+) through a third resistor R3, and a fourth resistor R4 is connected between the non-inverting input terminal (+) and a ground.

The plurality of driving voltage feedback lines EVDD_FBL are touch lines TL connected to a plurality of touch electrodes TE disposed on the display panel 110 to transmit touch signals, and the driving circuit further includes a touch driving circuit 160 transmitting touch driving signals and receiving touch sensing signals through the touch lines TL.

A display driving method of a display device 100 including a display panel 110 in which a plurality of driving voltage feedback lines branched from a driving voltage line DVL for supplying a driving voltage to a plurality of subpixels SP are disposed, according to an embodiment of present disclosure includes detecting a reference feedback driving voltage from a first driving voltage feedback line EVDD_FBL1, detecting a plurality of feedback driving voltages from a plurality of driving voltage feedback lines with different positions in the display panel 110, calculating a deviation between the reference feedback driving voltage and the plurality of feedback driving voltages, determining a compensation value of image data DATA according to the deviation between the reference feedback driving voltage and the plurality of feedback driving voltages, and supplying a compensated image data DATA_comp.

The plurality of driving voltage feedback lines with different positions in the display panel 110 include a second driving voltage feedback line EVDD_FBL2 connected to the driving voltage line DVL in an upper area of the display panel 110, a third driving voltage feedback line EVDD_FBL3 connected to the driving voltage line DL in a central area of the display panel 110, and a fourth driving voltage feedback line EVDD_FBL4 connected to the driving voltage line DVL in a lower area of the display panel 110.

The calculating the deviation includes comparing the reference feedback driving voltage and the plurality of feedback driving voltages, and converting the comparison result into a digital signal.

The feedback driving voltage is detected during a display driving period DP in which a touch signal is not supplied to the plurality of driving voltage feedback lines EVDD_FBL.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A display device, comprising:
   a display panel in which a plurality of driving voltage feedback lines branched from a driving voltage line for supplying a driving voltage to a plurality of subpixels are disposed;
   a driving circuit configured to supply a data voltage to the plurality of subpixels and determine a deviation of a feedback driving voltage detected through the plurality of driving voltage feedback lines; and
   a timing controller configured to compensate for image data depending on positions at which the plurality of driving voltage feedback lines are branched in the display panel based on the deviation of the feedback driving voltage, and supply a compensated image data to the driving circuit,
   wherein the plurality of driving voltage feedback lines are connected to a plurality of touch electrodes disposed on the display panel, the plurality of driving voltage feedback lines configured to transmit a touch signal.

2. The display device according to claim 1, wherein the driving voltage line includes a common driving voltage line arranged in a bezel area of the display panel adjacent to the driving circuit.

3. The display device according to claim 2, wherein the plurality of driving voltage feedback lines include:
   a first driving voltage feedback line used as a reference driving voltage feedback line;
   a second driving voltage feedback line connected to the driving voltage line in an upper area of the display panel;
   a third driving voltage feedback line connected to the driving voltage line in a central area of the display panel; and
   a fourth driving voltage feedback line connected to the driving voltage line in a lower area of the display panel.

4. The display device according to claim 3, wherein the reference driving voltage feedback line is connected to the common driving voltage line.

5. The display device according to claim 4, wherein the driving circuit includes:
   a differential amplifier circuit configured to compare a plurality of feedback driving voltages detected through the reference driving voltage feedback line and a plurality of driving voltage feedback lines; and
   an analog-to-digital converter configured to convert a differential voltage generated from the differential amplifier circuit into a digital signal.

6. The display device according to claim 5, wherein the differential amplifier circuit includes:
   a first operational amplifier that the second driving voltage feedback line is connected to an inverting input terminal of the first operational amplifier through a first resistor, a second resistor is connected between the inverting input terminal of the first operational amplifier and an output terminal of the first operational amplifier, the reference driving voltage feedback line is connected to a non-inverting input terminal of the first operational amplifier through a third resistor, and a fourth resistor is connected between the non-inverting input terminal of the first operational amplifier and a ground;
   a second operational amplifier that the third driving voltage feedback line is connected to an inverting input terminal of the second operational amplifier through a first resistor, a second resistor is connected between the inverting input terminal of the second operational amplifier and an output terminal of the second operational amplifier, the reference driving voltage feedback line is connected to a non-inverting input terminal of the second operational amplifier through a third resistor, and a fourth resistor is connected between the non-inverting input terminal of the second operational amplifier and the ground; and a third operational amplifier that the fourth driving voltage feedback line is connected to an inverting input terminal of the third operational amplifier through a first resistor, a second resistor is connected between the inverting input terminal of the third operational amplifier and an output terminal of the third operational amplifier, the reference driving voltage feedback line is connected to a non-inverting input terminal of the third operational amplifier through a third resistor, and a fourth resistor is connected between the non-inverting input terminal of the third operational amplifier and the ground.

7. The display device according to claim 1, wherein the feedback driving voltage is detected during a display driving period in which the touch signal is not supplied to the plurality of driving voltage feedback lines.

8. The display device according to claim 1, wherein the plurality of driving voltage feedback lines extend to a bezel area located outside an active area on which an image is displayed through the plurality of subpixels.

9. The display device according to claim 1, wherein the driving circuit includes a touch driving circuit configured to transmit a touch driving signal and receive a touch sensing signal through the touch line.

10. A driving circuit, comprising:
a differential amplifier circuit configured to compare a plurality of feedback driving voltages detected through a plurality of driving voltage feedback lines branched from a driving voltage line that supplies a driving voltage in a plurality of predetermined areas in a display panel that includes a plurality of subpixels; and
an analog-to-digital converter configured to convert a differential voltage generated from the differential amplifier circuit into a digital signal,
wherein the plurality of driving voltage feedback lines include touch lines connected to a plurality of touch electrodes disposed on the display panel to transmit touch signals, and
the driving circuit further includes a touch driving circuit configured to transmit touch driving signals and receive touch sensing signals through the touch lines.

11. The driving circuit according to claim 10, wherein the plurality of driving voltage feedback lines include:
a first driving voltage feedback line used as a reference driving voltage feedback line;
a second driving voltage feedback line connected to the driving voltage line in an upper area of the display panel;
a third driving voltage feedback line connected to the driving voltage line in a central area of the display panel; and
a fourth driving voltage feedback line connected to the driving voltage line in a lower area of the display panel.

12. The driving circuit according to claim 11, wherein the differential amplifier circuit includes:
a first operational amplifier that the second driving voltage feedback line is connected to an inverting input terminal of the first operational amplifier through a first resistor, a second resistor is connected between the inverting input terminal of the first operational amplifier and an output terminal of the first operational amplifier, the reference driving voltage feedback line is connected to a non-inverting input terminal of the first operational amplifier through a third resistor, and a fourth resistor is connected between the non-inverting input terminal of the first operational amplifier and a ground;

a second operational amplifier that the third driving voltage feedback line is connected to an inverting input terminal of the second operational amplifier through a first resistor, a second resistor is connected between the inverting input terminal of the second operational amplifier and an output terminal of the second operational amplifier, the reference driving voltage feedback line is connected to a non-inverting input terminal of the second operational amplifier through a third resistor, and a fourth resistor is connected between the non-inverting input terminal of the second operational amplifier and the ground; and a third operational amplifier that the fourth driving voltage feedback line is connected to an inverting input terminal of the third operational amplifier through a first resistor, a second resistor is connected between the inverting input terminal of the third operational amplifier and an output terminal of the third operational amplifier, the reference driving voltage feedback line is connected to a non-inverting input terminal of the third operational amplifier through a third resistor, and a fourth resistor is connected between the non-inverting input terminal of the third operational amplifier and the ground.

13. A display driving method of a display device including a display panel in which a plurality of driving voltage feedback lines branched from a driving voltage line for supplying a driving voltage to a plurality of subpixels are disposed, the method comprising:
detecting a reference feedback driving voltage from a first driving voltage feedback line;
detecting a plurality of feedback driving voltages from a plurality of driving voltage feedback lines with different positions in the display panel;
calculating a deviation between the reference feedback driving voltage and the plurality of feedback driving voltages;
determining a compensation value of image data according to the deviation between the reference feedback driving voltage and the plurality of feedback driving voltages; and
supplying a compensated image data,
wherein the plurality of driving voltage feedback lines are connected to a plurality of touch electrodes disposed on the display panel, the plurality of driving voltage feedback lines configured to transmit a touch signal.

14. The display driving method according to claim 13, wherein the plurality of driving voltage feedback lines with different positions in the display panel include:
a second driving voltage feedback line connected to the driving voltage line in an upper area of the display panel;
a third driving voltage feedback line connected to the driving voltage line in a central area of the display panel; and
a fourth driving voltage feedback line connected to the driving voltage line in a lower area of the display panel.

15. The display driving method according to claim 13, wherein calculating the deviation includes:

comparing the reference feedback driving voltage and the plurality of feedback driving voltages; and
converting the comparison result into a digital signal.

16. The display driving method according to claim 13, wherein the feedback driving voltage is detected during a display driving period in which the touch signal is not supplied to the plurality of driving voltage feedback lines.

* * * * *